United States Patent (10) Patent No.: US 10,513,446 B2
Vuong                                  (45) Date of Patent:    Dec. 24, 2019

(54) DEPTH EXPOSED MEMBRANE FOR WATER EXTRACTION

(71) Applicant: EcoDesal, LLC, Tustin, CA (US)

(72) Inventor: Diem Xuan Vuong, San Clemente, CA (US)

(73) Assignee: EcoDesal, LLC, Reno, NV (US)

( * ) Notice: Subject to any disclaimer, the term of this patent is extended or adjusted under 35 U.S.C. 154(b) by 719 days.

(21) Appl. No.: 14/858,522

(22) Filed: Sep. 18, 2015

(65) Prior Publication Data

US 2016/0101994 A1    Apr. 14, 2016

Related U.S. Application Data

(60) Provisional application No. 62/062,771, filed on Oct. 10, 2014, provisional application No. 62/156,789, filed on May 4, 2015.

(51) Int. Cl.
```
C02F 1/44      (2006.01)
B01D 61/10     (2006.01)
B01D 63/10     (2006.01)
C02F 103/06    (2006.01)
C02F 103/08    (2006.01)
```

(52) U.S. Cl.
CPC .............. *C02F 1/441* (2013.01); *B01D 61/10* (2013.01); *B01D 63/10* (2013.01); *C02F 1/442* (2013.01); *B01D 2311/14* (2013.01); *B01D 2313/143* (2013.01); *B01D 2313/44* (2013.01); *B01D 2315/06* (2013.01); *C02F 2103/06* (2013.01); *C02F 2103/08* (2013.01); *Y02A 20/131* (2018.01); *Y02W 10/37* (2015.05)

(58) Field of Classification Search
CPC .......... B01D 2311/14; B01D 2313/143; B01D 2313/44; B01D 2315/06; B01D 61/10; B01D 63/10; C02F 1/441; C02F 1/442; C02F 2103/06; C02F 2103/08; Y02W 10/37

See application file for complete search history.

(56) References Cited

U.S. PATENT DOCUMENTS

| 3,060,119 A | 10/1962 | Carpenter |
| 3,171,808 A | 3/1965 | Todd |
| 3,456,802 A | 7/1969 | Cole |
| 3,552,574 A | 1/1971 | Lowe et al. |
| 3,608,730 A | 9/1971 | Blaha |

(Continued)

FOREIGN PATENT DOCUMENTS

| CN | 1654342 A | 8/2005 |
| DE | 02917058 C2 | 4/1982 |

(Continued)

OTHER PUBLICATIONS

"Physical Treatments:Desalination by Hydrostatic Pressure", Water Technology News, vol. 5, No. 6, Sep. 1, 1997.

(Continued)

*Primary Examiner* — John Kim
(74) *Attorney, Agent, or Firm* — Knobbe Martens Olson & Bear, LLP

(57) ABSTRACT

Systems and methods for the desalination of seawater and the purification of surface and groundwater are provided. The systems utilize the hydrostatic pressure of a natural or induced water column to filter water through a reverse osmosis, nanofiltration or other membrane, whereby a certain desired water quality or potable water is obtained.

7 Claims, 9 Drawing Sheets

(56) References Cited

U.S. PATENT DOCUMENTS

| | | |
|---|---|---|
| 3,655,051 A | 4/1972 | Quase |
| 3,883,412 A | 5/1975 | Jensen |
| 3,904,519 A | 9/1975 | McKinney et al. |
| 3,930,958 A | 1/1976 | Maruichi |
| 3,943,057 A | 3/1976 | Jamet et al. |
| 3,968,036 A | 7/1976 | Liles et al. |
| 3,970,564 A | 7/1976 | Shamsutdinov et al. |
| 3,986,938 A | 10/1976 | Smith |
| 3,996,131 A | 12/1976 | Conn |
| 4,002,563 A | 1/1977 | Vogl et al. |
| 4,066,551 A | 1/1978 | Stern |
| 4,116,841 A | 9/1978 | Borsanyi |
| 4,164,854 A | 8/1979 | Martin |
| 4,231,873 A | 11/1980 | Swigger |
| 4,235,678 A | 11/1980 | McKeen |
| 4,288,326 A | 9/1981 | Keefer |
| 4,289,626 A | 9/1981 | Knopp et al. |
| 4,341,629 A | 7/1982 | Uhlinger |
| 4,391,676 A | 7/1983 | Torberger |
| 4,414,114 A | 11/1983 | Drude et al. |
| 4,426,322 A | 1/1984 | Stage |
| 4,431,539 A | 2/1984 | Borsanyi |
| 4,473,476 A | 9/1984 | McMillan et al. |
| 4,504,362 A | 3/1985 | Kruse |
| 4,512,886 A | 4/1985 | Hicks et al. |
| 4,526,688 A | 7/1985 | Schmidt, Jr. |
| 4,556,488 A | 12/1985 | Timm et al. |
| 4,594,158 A | 6/1986 | Chong et al. |
| 4,610,792 A | 9/1986 | Van Gils et al. |
| 4,702,842 A | 10/1987 | LaPierre |
| 4,770,775 A | 9/1988 | Lopez |
| 4,801,375 A | 1/1989 | Padilla |
| 4,806,244 A | 2/1989 | Guilhem |
| 4,849,109 A | 7/1989 | Sleytr et al. |
| 4,891,140 A | 1/1990 | Burke |
| 4,952,317 A | 8/1990 | Culkin |
| 5,028,329 A | 7/1991 | Drioli et al. |
| 5,084,182 A | 1/1992 | Arthur |
| 5,096,583 A | 3/1992 | Roux |
| 5,192,434 A | 3/1993 | Moller |
| 5,198,116 A | 3/1993 | Comstock et al. |
| 5,229,005 A | 7/1993 | Fok et al. |
| 5,238,559 A | 8/1993 | Nieweg |
| 5,254,261 A | 10/1993 | Tomaschke et al. |
| 5,282,979 A | 2/1994 | Wilson |
| 5,348,651 A | 9/1994 | Carlson et al. |
| 5,366,635 A | 11/1994 | Watkins |
| 5,451,317 A | 9/1995 | Ishida |
| 5,494,577 A | 2/1996 | Rekers |
| 5,505,841 A | 4/1996 | Pirbazari et al. |
| 5,545,320 A | 8/1996 | Heine et al. |
| 5,552,022 A | 9/1996 | Wilson |
| 5,553,456 A | 9/1996 | McCormack |
| 5,626,752 A | 5/1997 | Mohn et al. |
| 5,632,890 A | 5/1997 | Sugimoto |
| 5,650,050 A | 7/1997 | Kaufmann |
| 5,690,829 A | 11/1997 | Lauer |
| 5,914,041 A | 6/1999 | Chancellor |
| 5,916,441 A | 6/1999 | Raether |
| 5,919,376 A | 7/1999 | Carman |
| 5,932,074 A | 8/1999 | Hoiss |
| 6,010,475 A | 1/2000 | Thomas |
| 6,027,649 A | 2/2000 | Benedek et al. |
| 6,083,382 A | 7/2000 | Bird |
| 6,103,125 A | 8/2000 | Kuepper |
| 6,180,012 B1 | 1/2001 | Rongved |
| 6,187,200 B1 | 2/2001 | Yamamura et al. |
| 6,217,782 B1 | 4/2001 | Tuori |
| 6,221,255 B1 | 4/2001 | Vadoothker |
| 6,251,271 B1 | 6/2001 | Hagqvist |
| 6,348,148 B1 | 2/2002 | Bosley |
| 6,391,162 B1 | 5/2002 | Kamiya et al. |
| 6,406,622 B1 | 6/2002 | Tsuhiji |
| 6,475,460 B1 | 11/2002 | Max |
| 6,485,644 B2 | 11/2002 | Bowler |
| 6,656,352 B2 | 12/2003 | Bosley |
| 6,663,750 B1 | 12/2003 | Coon |
| 6,702,944 B2 | 3/2004 | Husain et al. |
| 6,767,471 B2 | 7/2004 | Max |
| 6,800,201 B2 | 10/2004 | Bosley |
| 6,890,444 B1 | 5/2005 | Max |
| 6,955,222 B2 | 10/2005 | Lien |
| 6,969,467 B1 | 11/2005 | Max et al. |
| 6,991,722 B2 | 1/2006 | Max |
| 7,008,540 B1 | 3/2006 | Weavers |
| 7,023,104 B2 | 4/2006 | Koashikawa et al. |
| 7,067,044 B1 | 6/2006 | Coon |
| 7,081,205 B2 | 7/2006 | Gordon |
| 7,135,114 B2 | 11/2006 | Nonninger |
| 7,144,511 B2 | 12/2006 | Vuong |
| 7,166,244 B2 | 1/2007 | Tonkin et al. |
| 7,192,522 B2 | 3/2007 | Grangeon |
| 7,294,274 B2 | 11/2007 | Kirker |
| 7,371,322 B2 | 5/2008 | Kirker |
| 7,381,335 B2 | 6/2008 | Lee |
| 7,422,689 B2 | 9/2008 | Noguchi |
| 7,425,265 B2 | 9/2008 | Schoendorfer |
| 7,445,716 B2 | 11/2008 | Quintel |
| 8,685,252 B2 | 4/2014 | Vuong |
| 2002/0003111 A1 | 1/2002 | Max |
| 2002/0038782 A1 | 4/2002 | Kim |
| 2002/0134724 A1 | 9/2002 | Heine et al. |
| 2002/0189987 A1 | 12/2002 | Wagner |
| 2003/0052054 A1 | 3/2003 | Pearl et al. |
| 2003/0111402 A1 | 6/2003 | Baig et al. |
| 2003/0141250 A1 | 7/2003 | Kihara et al. |
| 2003/0173282 A1 | 9/2003 | Yamanaka et al. |
| 2004/0007881 A1 | 1/2004 | Kobashikawa et al. |
| 2004/0084156 A1 | 5/2004 | Hata |
| 2004/0108272 A1 | 6/2004 | Bosley |
| 2005/0082214 A1 | 4/2005 | Max |
| 2005/0123727 A1 | 6/2005 | Hester et al. |
| 2005/0218074 A1 | 10/2005 | Pollock |
| 2006/0144789 A1 | 7/2006 | Cath et al. |
| 2008/0190849 A1 | 8/2008 | Vuong |
| 2010/0051546 A1 | 9/2010 | Vuong |
| 2010/0237016 A1 | 9/2010 | Vuong et al. |
| 2012/0000851 A1 | 1/2012 | Vuong |
| 2014/0197086 A1 | 7/2014 | Vuong et al. |

FOREIGN PATENT DOCUMENTS

| | | |
|---|---|---|
| DE | 04036658 A1 | 1/1992 |
| DE | 04107099 A1 | 9/1992 |
| DE | 19508821 A1 | 3/1995 |
| DE | 19734981 A1 | 8/1997 |
| DE | 19801174 A1 | 7/1999 |
| DE | 102004010017 | 9/2005 |
| DE | 102006002314 | 3/2007 |
| EP | 0593687 B1 | 5/1997 |
| EP | 0968755 A3 | 1/2000 |
| EP | 1350766 A1 | 5/2000 |
| EP | 0970018 B1 | 7/2001 |
| GB | 1135132 A | 11/1968 |
| GB | 1141138 A | 1/1969 |
| GB | 1148295 A | 4/1969 |
| GB | 1390418 A | 4/1975 |
| GB | 1441014 A | 6/1976 |
| GB | 02256377 A | 12/1992 |
| JP | 54116382 | 9/1979 |
| JP | 55073387 | 6/1980 |
| JP | 58098182 | 6/1983 |
| JP | 58124579 | 7/1983 |
| JP | 58124584 | 7/1983 |
| JP | 59059284 | 4/1984 |
| JP | 59066391 | 4/1984 |
| JP | 59127690 | 7/1984 |
| JP | 59177189 | 10/1984 |
| JP | 60034785 | 2/1985 |
| JP | 08168653 | 7/1996 |
| JP | 09085243 | 3/1997 |
| JP | 9094438 | 4/1997 |
| JP | 09123997 | 5/1997 |
| JP | 01017838 | 1/2001 |

(56) References Cited

FOREIGN PATENT DOCUMENTS

| | | |
|---|---|---|
| JP | 02204911 | 7/2002 |
| JP | 02254066 | 9/2002 |
| JP | 04098065 | 4/2004 |
| JP | 04160301 | 6/2004 |
| JP | 04283798 | 10/2004 |
| JP | 04290945 | 10/2004 |
| JP | 05052802 | 3/2005 |
| SU | 422425 A1 | 4/1974 |
| SU | 2119377 C1 | 9/1988 |
| TW | 200902452 A | 1/2009 |
| WO | WO 1985/004159 A1 | 9/1985 |
| WO | WO 1993/010048 A1 | 5/1993 |
| WO | WO 1996/023567 A1 | 8/1996 |
| WO | WO 1996/036564 A1 | 11/1996 |
| WO | WO 1998/057732 | 12/1998 |
| WO | WO 1999/006323 A1 | 2/1999 |
| WO | WO 2000/041971 | 7/2000 |
| WO | WO 2001/046007 A1 | 6/2001 |
| WO | WO 2001/074721 A3 | 10/2001 |
| WO | WO 2002/020410 A1 | 3/2002 |
| WO | WO 2004/007953 A1 | 1/2004 |
| WO | WO 2004/074187 | 9/2004 |
| WO | WO 2005/044733 | 5/2005 |
| WO | WO 2005/068371 | 7/2005 |
| WO | WO 2006/006942 | 1/2006 |
| WO | WO 2006/006942 A1 | 1/2006 |
| WO | WO 2010/003141 | 1/2010 |
| WO | WO 2011/097403 A1 | 8/2011 |
| WO | WO 2013/009477 | 1/2013 |
| WO | WO 2013/154777 A1 | 10/2013 |

OTHER PUBLICATIONS

Al-Kharabsheh, S., "An innovative reverse osmosis desalination system using hydrostatic pressure", Desalination 196 (2006), pp. 210-214.
Avula, "Sphering of a liquid-filled membrane (Stress field and deformed shapes of liquid filled axisymmetric sessile neo-Hookean membrane during submergence to various depths)", Southeastern Conference on Theoretical and Applied Mechanics, 6th, Tampa, Fla ; Mar. 23-24, 1972.
Boehner, "Solar desalination with a high efficiency multieffect process offers new facilities.", Desalination 73 (1989), pp. 197-203.
Chang et al., "Membrane Fouling in Membrane Bioreactors for Wastewater Treatment", Journal of Environmental Engineering, vol. 128, Issue 11 (Nov. 2002), pp. 1018-1029.
Colombo et al., "An energy-efficient submarine desalination plant", Desalination 122 (1999), pp. 171-176.
Djebedjian et al., Reverse Osmosis Desalination Plant in Nuweiba City (Case Study), Eleventh International Water Technology Conference, IWTCC11 Sharm El-Sheikh, Egypt (2007), pp. 315-330.
Dow Water Solutions FILMTEC™ Reverse Osmosis Membranes Technical Manual, Form No. 609-00071-0308, publication date unknown, pp. 1-180.
Dytnersky, Yu I., Baromembrane Processes, Moskva, Khimiya, 1986, p. 38, 75.
Karelin, F.N., Water Demineralization by Reverse Osmosis, Moskva, Stroyizdat, 1988, p. 137.
International Search Report and Written Opinion dated Jun. 13, 2011 for International Application No. PCT/US2011/023637.
International Search Report; PCT/US2012/044456; dated Oct. 4, 2012, 8 pages.
Negus-De Wys, "Properties of geopressured brines and wells in the Gulf Coast and opportunities for industrial/research participation", Conference: US Department of Energy research and development for the geothermal marketplace: 7th geothermal program review, San Francisco, CA, USA, Mar. 21-23, 1989.
Pacenti et al., "Deployment of a submarine reverse osmosis desalination prototype plant (RODSS): field tests and preliminary technical evaluations", Desalination 138 (2001), p. 181.
Pacenti et al., "Submarine seawater reverse osmosis desalination system", Desalination 126 (1999), pp. 213-218.
Paulsen et al., "Introduction of a new Energy Recovery System—optimized for the combination with renewable energy", Desalination 184 (2005), pp. 211-215.
Pleass, "The use of wave powered systems for desalination—A new opportunity (seawater pumping for reverse osmosis)", International Symposium on Wave and Tidal Energy, Canterbury, England, Sep. 27-29, 1978.
Reali et al., "Energy-efficient schemes for seawater desalination", Desalination 105 (1996), p. 171.
Reali et al., "Submarine and underground reverse osmosis schemes for energy-efficient seawater desalination", Desalination 109 (1997), pp. 269-275.
Sawyer et al., "An investigation into the economic feasibility of unsteady incompressible duct flow (waterhammer) to create hydrostatic pressure for seawater desalination using reverse osmosis" Desalination 138 (2001), pp. 307-317.
Shimizu et al., "Filtration characteristics of hollow fiber microfiltration membranes used in membrane bioreactor for domestic wastewater treatment", Water Research vol. 30, Issue 10 (Oct. 1996), pp. 2385-2392.
Tian, "Simple and safe deep pool reactor for low-temperature heat supply", Prog. Nucl. Energy, vol. 37, No. 1-4; pp. 271-610, 2000.
Wastewater Engineering Treatment and Reuse, Fourth Ed., Metcalf & Eddy, Inc., 2002, pp. 1114-1126.
Zewen et al., "The Kuwait solar thermal power station: operational experiences with the station and the agricultural application", Solar World Congress, vol. 3, pp. 1527-1532, 1983.
Zhu et al., "Modeling of ultrasonic enhancement on membrane distillation", Journal of Membrane Science, vol. 136, Issue 1 (Aug. 2000), pp. 31-41.
Gu, Zhilong, Translation of WO 2000/41971, WIPO, Jul. 2000, pp. 1-22.
European Search Report for Application No. 08743464.3 dated Sep. 1, 2011.
International Search Report and Written Opinion for App No. PCT/US2008/053753 dated Jun. 5, 2008.
First Office Action in Taiwanese Patent Application No. 104133205, dated Sep. 26, 2016.
International Search Report and Written Opinion in International Application No. PCT/US15/54556, dated Jan. 4, 2016.

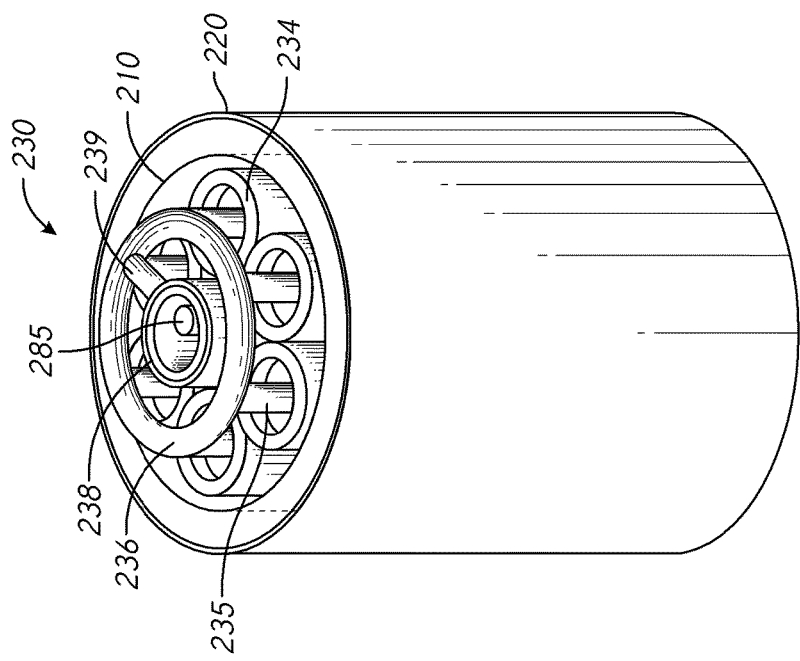
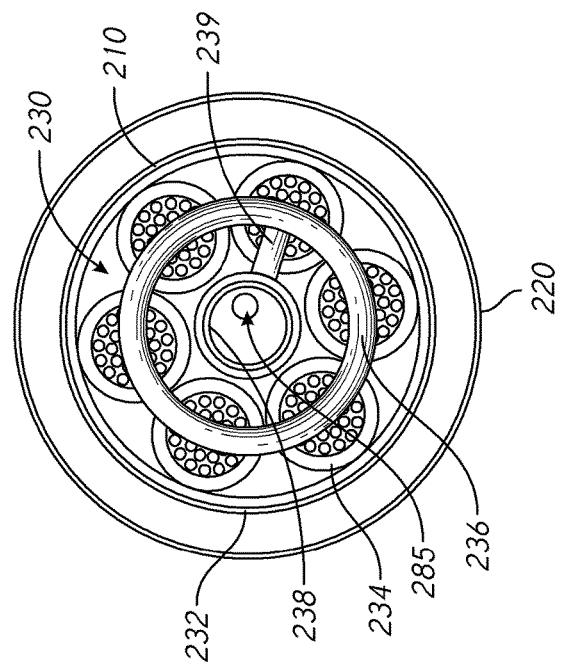
FIG. 6B
FIG. 6A

DEPTH EXPOSED MEMBRANE FOR WATER EXTRACTION

INCORPORATION BY REFERENCE TO ANY PRIORITY APPLICATIONS

Any and all priority claims identified in the Application Data Sheet, or any correction thereto, are hereby incorporated by reference in their entirety. This application claims the benefit of U.S. Provisional Application No. 62/062,771, filed Oct. 10, 2014, and U.S. Provisional Application No. 62/156,789, filed May 4, 2015. Each of the aforementioned applications is incorporated by reference herein in its entirety, and each is hereby expressly made a part of this specification.

FIELD OF THE INVENTION

Systems and methods for the desalination and purification of seawater, brackish water, surface and groundwater are provided. The systems utilize the hydrostatic pressure of an induced water column to filter water through a reverse osmosis, nanofiltration or other membrane, whereby a certain desired water quality or potable water is obtained.

BACKGROUND OF THE INVENTION

More than 97% of water on earth is seawater; three fourths of the remaining water is locked in glacier ice; and less than 1% is in aquifers, lakes and rivers that can be used for agriculture, industrial, sanitary and human consumption. As water in aquifers, lakes and rivers is a renewable resource, this small fraction of the Earth's water is continually re-used. It is the rate of this reuse that has stressed conventional water resources.

In the last century, these water sources became stressed as growing population and pollution limited the availability of easy-to-access freshwater. Recently localized water shortages required the development of desalination plants which make potable water from salty ocean water. The conventional desalination process includes three major steps: pretreatment; desalination; and post-treatment. In the pre-treatment step, seawater is brought from the ocean to the site of desalination, and then conditioned according to the desalination process to be employed. Water is typically taken from shallow, near-shore areas that contain suspended (e.g., organic or inorganic) material that must be filtered out prior to the desalting process. In the desalination step, a method such as Multistage Flash Distillation (MSF), Multi-effect Distillation (MED), Electro Dialysis (ED), or Reverse Osmosis (RO) is employed to remove salts from the water. The desalination processes typically require substantial amounts of energy in various forms (e.g., mechanical, electrical, etc.), and the disposal of the concentrated brine generated by the process can be a significant environmental concern. In the post-treatment step, product water of the desalination process is conditioned according to its ultimate use.

Multistage flash or multi-effect distillation was the process of choice for the desalination industry for many years, but since the 1990s, improvements in membrane technology and increases in energy costs have made reverse osmosis the clear leader for new capacity.

Reverse Osmosis is a membrane process that acts as a molecular filter to remove 95 to 99% of dissolved salts and inorganic molecules, as well as organic molecules. Osmosis is the natural process which occurs when water or another solvent spontaneously flows from a less-concentrated solution, through a semi-permeable membrane, and into a more concentrated solution. In Reverse Osmosis the natural osmotic forces are overcome by applying an external pressure to the concentrated solution (feed). Thus the flow of water is reversed and desalinated water (permeate) is removed from the feed solution, leaving a more concentrated salt solution (brine). Product water quality can be further improved by adding a second pass of membranes, whereby product water from the first pass is fed to the second pass. In a reverse osmosis process as is typically commercially employed, pretreated seawater is pressurized to between 850 and 1,200 pounds per square inch (psi) (5,861 to 8,274 kPa) in a vessel housing, e.g., a spiral-wound reverse osmosis membrane. Seawater contacts a first surface of the membrane, and through application of pressure, potable water penetrates the membrane and is collected at the opposite side. The concentrated brine generated in the process, having a salt concentration up to about twice that of seawater, is disposed back into the ocean.

SUMMARY OF THE INVENTION

A highly efficient and innovative process and apparatus for desalination and the purification of seawater, brackish water, surface water and groundwater is provided. The depth exposed membrane for water extraction as provided is a novel approach to both fresh surface water treatment and seawater desalination that deploys a system directly within the source water body, utilizing the natural pressure that exists at depth. This system brings this natural pressure based system onshore, providing the similar type of energy savings without the disadvantages of offshore operation.

The process uses the hydrostatic pressure in a shaft (e.g., a constructed shaft, a tunnel a well or any other passageway extending down into the earth) to drive a reverse osmosis process to remove, e.g., dissolved salts or an osmotic or filtering process in fresh or brackish bodies to screen out unwanted constituents such as salts, viruses and bacteria. The process is advantageous in its elimination of systems that would be otherwise necessary in a conventional desalination plant or in a conventional water treatment plant and that it allows efficient use of hydrostatic pressure as a substitute for a portion or most of the pump generated pressure required to facilitate reverse osmosis or other filtration processes. In preferred embodiments, specially made membrane elements are arrayed in a shaft or tunnel at a depth sufficient to overcome the osmotic pressure. If a tunnel is used, it is in fluid communication with a constructed shaft near the body of water to be treated. The shaft is in fluid communication with the body of water. The specially made membrane element is made to allow small contaminants to pass through the element and to allow very low resistance (head loss). A spiral wound membrane used with a feed water spacer will be much wider than is traditionally used and in some cases specifically designed to promote vertical flow through the membranes. For seawater the elements are fitted with reverse osmosis membrane. In other preferred embodiments, system elements can be provided with nanofiltration membranes and used to screen contaminants from surface, brackish or ground water.

One benefit of the system as provided is the ability to harness natural water pressure (hydrostatic pressure from water depth) to drive a reverse osmosis process in lieu of artificially creating this pressure. The system employs membranes where natural pressure can be created in deep well bores. Water movement is created by bringing in feed water through an upper ocean pipe and out through a lower ocean pipe, passing through membranes at the bottom of an internal open tube in the well bore. The system has many applications but the two primary applications are the desalination of seawater and the treatment of brackish or fresh water inland. For both primary applications, there are four basic premises or design traits behind the technology. First is natural water pressure is variable in amount. Well bores of increasing depths provide increasing pressure accommodating characteristics of both existing source water and required product water specifications. Second is atmospheric pressure communication. Communication of atmospheric pressure to the membrane permeate collection tube allows the natural creation of the pressure differential needed for the process. This differential is maintained by pumping the permeate water to the surface (e.g., the surface of the earth, above the surface of the earth, or a level below the surface of the earth but above above a topmost surface of the body of water). Third is water movement. All membrane processes require the movement of feed water to the membrane surface and removal of the concentrate or brine. The membranes in the system are designed so that gravity and small pump lifts remove any concentrate and bring more water to the surface of the membranes. The spacers between the membranes are at least 3 times those used in traditional spiral-wound reverse osmosis (SWRO) configurations allowing for an uninterrupted flow of water between them. Fourth is low flux. Membrane flux (produced water per unit of membrane area) is often associated with system efficiency in traditional systems. That is, higher flux means less pre-treatment costs, less membrane, fewer pressure vessels, etc. However, higher flux also means higher transmembrane pressure and higher velocities into the membrane face. Low flux, on the other hand, reduces the driving pressure requirement. Low flux also reduces stress and fouling on membranes increasing the effective life and reduces particulate fouling.

The membrane cartridge of the system includes multiple cylindrically wound reverse osmosis membranes spaced with specially designed spacers to minimize head loss. The membranes are directly exposed to the seawater in the water column. The voids between these membranes are open on the top and bottom to allow water to naturally pass through. The lower recovery rate, and thus lower pressure requirement, results in significantly reduced capital, operating and environmental costs typically associated with traditional SWRO systems. The depth needed for the system in the ocean is approximately 300 meters.

Accordingly, in a first aspect a filtration system is provided, the system comprising a membrane module configured to be submerged in a shaft or tunnel that is in fluid communication with a water body, at a submerged depth, the membrane module comprising at least one membrane cartridge, the membrane cartridge comprising at least one membrane element, the membrane element having a first side and a second side, wherein the first side of the membrane element is exposed to the water to be filtered at a pressure characteristic of the submerged depth; a collector passageway configured to be submerged in the shaft or tunnel, in an adjacent tunnel or below the membranes elements in the same shaft, wherein at least a portion of the collector passageway is in fluid communication with the second side of the membrane element where filtered water is collected; and a permeate passageway extending from the collector passageway to the surface above the shaft, wherein a differential between the pressure characteristic of the submerged shaft or tunnel depth and the pressure characteristic of atmospheric pressure at the surface or at an elevation higher than the surface causes permeate to flow from the first side of the membrane element to the second side of the membrane element.

In an embodiment of the first aspect, the permeate passageway is configured to expose an interior of the collector passageway to a pressure characteristic of atmospheric pressure at the surface or at an elevation higher than the surface of the body of water.

In an embodiment of the first aspect, the filtration system comprises a pump oriented between the collector passageway and the permeate passageway, wherein the pump causes permeate to flow in the direction of the surface.

In an embodiment of the first aspect, the membrane module comprises at least one feed spacer, wherein the membrane elements is in a spiral wound format.

In an embodiment of the first aspect, the membrane element feed spacer is at least about 50 mils (1.27 mm) thick, at least about 60 mils (1.52 mm) thick, at least about 70 mils (1.78 mm) thick, at least about 90 mils (2.29 mm) thick, or at least about 120 mils (3.05 mm) thick.

In an embodiment of the first aspect, the differential between the pressure characteristic of the submerged depth in a shaft or tunnel and the pressure characteristic of atmospheric pressure at the surface provides substantially all of the force driving the filtration process, in the absence of a mechanical device to increase the pressure to which the first side of the membrane is exposed, but requiring a mechanical device to reduce the pressure to which the second side of the membrane is exposed and maintain the differential pressure.

In an embodiment of the first aspect, the filtration system comprises an influent passageway, wherein the influent passageway is configured to receive feed water, and an effluent passageway, wherein the effluent passageway is configure to allow for the outflow of concentrated brine from the filtration system, wherein the influent passageway, the effluent passageway, and the permeate passageway are each exposed to atmospheric pressure. The permeate passageway may be at least partially responsible for the differential driving the filtration process. The influent passageway and effluent passageway may be positioned so that there is a height differential between the influent passageway and effluent passageway. The height differential may be at least partially responsible for causing the circulation of feed water or the removal of concentrated brine from the filtration system. The filtration system may further comprise a pump to introduce feed water into the influent tunnel of the filtration system.

In an embodiment of the first aspect, the membrane element comprises two membrane layers spaced apart by at least one permeate spacer.

In an embodiment of the first aspect, the membrane cartridge comprises at least two membrane elements.

In an embodiment of the first aspect, the water treatment system comprises a plurality of membrane elements, wherein each membrane element is spaced apart from an adjacent membrane element by at least about 2 mm.

In an embodiment of the first aspect, the water treatment system comprises a plurality of membrane elements, wherein each membrane element is spaced apart from an adjacent membrane element by from about 2 mm to about 8 mm.

In an embodiment of the first aspect, the water treatment system comprises a plurality of membrane elements, wherein each membrane element is spaced apart from an adjacent membrane element by about 6 mm.

In an embodiment of the first aspect, the membrane element comprises two flat sheet membranes in a parallel configuration, the membrane element further comprising at least one collector spacer situated between two flat sheet membranes, wherein the collector spacer is configured to separate the two flat sheet membranes from each other.

In an embodiment of the first aspect, the membrane module comprises a plurality of the membrane cartridges constructed in the traditional spiral-wound configuration.

In an embodiment of the first aspect, the membrane element comprises at least one nanofiltration membrane. The membrane module can be configured to be submerged in the constructed shaft or a tunnel in fluid communication with the constructed shaft which is in fluid communication with a natural body of water to a depth of at least about 6 meters, or to a depth of at least about 8 meters, or to a depth of at least about 10 meters, or to a depth of from about 12 meters to about 18 meters, or to a depth of at least about 30 meters, or to a depth of at least about 60 meters, or to a depth of about 60 meters, or to a depth of from about 60 meters to about 244 meters, or to a depth of from about 122 meters to about 152 meters, or to a depth of from about 152 meters to about 183 meters.

In an embodiment of the first aspect, the membrane element comprises at least one reverse osmosis membrane. The membrane module can be configured to be submerged to a depth of at least about 190 meters, or to a depth of at least about 244 meters, or to a depth of from about 259 meters to about 365 meters, or to a depth greater than 365 meters as required to overcome the osmotic pressure of the water being treated, which may be as much as 380 meters or 400 meters.

In an embodiment of the first aspect, the membrane element comprises at least one ultrafiltration membrane. The membrane module can be configured to be submerged in the shaft or tunnel to a depth of at least about 6 meters, or to a depth of at least about 8 meters, or to a depth of at least about 10 meters, or to a depth of from about 12 meters to about 18 meters, or to a depth of at least about 22 meters, or to a depth of from about 22 meters to about 60 meters.

In an embodiment of the first aspect, the membrane element comprises at least one microfiltration membrane. The membrane module can configured to be submerged to a depth of at least about 6 meters, or to a depth of at least about 8 meters, or to a depth of at least about 10 meters, or to a depth of from about 12 meters to about 18 meters.

In an embodiment of the first aspect, the membrane module is configured to be submerged to a depth of at least about 7 meters, and is further configured to substantially avoid entrainment of aquatic life as permeate passes from the first side of the membrane element to the second side of the membrane element.

In an embodiment of the first aspect, the differential between the pressure characteristic of the submerged shaft or tunnel depth and the pressure characteristic of atmospheric pressure at the surface of the body of water provides substantially all of the force driving the filtration process, in the absence of a mechanical device to increase the pressure to which the first side of the membrane is exposed, and in the absence of a mechanical device to reduce the pressure to which the second side of the membrane is exposed.

In another embodiment of the first aspect, the filtration system further comprises a submersible pump that transmits permeate to the surface. The submersible pump may be positioned above, below, or between the membrane elements. The submersible pump may provide exposure to atmospheric pressure, allowing for a differential between the pressure characteristic of the submerged shaft or tunnel depth and the pressure characteristic of atmospheric pressure at the surface of the body of water. The pressure differential may be at least partially responsible for driving the filtration process.

In a second aspect, a water treatment system is provided comprising at least one membrane configured to be submerged to a depth in a shaft or tunnel flooded with water to be treated, the water having a first pressure at the submerged depth, the membrane having a concentrate side and a permeate side; a collector in fluid communication with the permeate side of the membrane; and a passageway configured to expose an interior of the collector to a second pressure which is lower than the first pressure, wherein exposing the concentrate side of the membrane to the first pressure drives a filtration process in which permeate moves across the membrane from the concentrate side to the permeate side.

In an embodiment of the second aspect, the permeate is transmitted through the passageway through action of the pump. The pump may be at least partially responsible for maintaining the pressure differential that drives the filtration process. The pump may provide exposure to atmospheric pressure, allowing for a differential between a pressure characteristic of the submerged shaft or tunnel depth and a pressure characteristic of atmospheric pressure at the surface of the body of water to develop, the differential causing water to flow from the concentrate side of the membrane to the permeate side of the membrane.

In an embodiment of the second aspect, the passageway extends from the collector to at least the surface and communicates atmospheric pressure to the collector.

In an embodiment of the second aspect, the collector is the passageway.

In a third aspect, a water treatment system is provided comprising means for screening out at least one constituent from a source water to produce a product water, the screening means having a source water side and a product water side, wherein the source water side is configured to be exposed to a hydrostatic pressure of the source water; and means for collecting the product water, wherein the collecting means is configured to be exposed to a pressure lower than the hydrostatic pressure.

In an embodiment of the third aspect, the means for screening can comprise one or more membranes. The one or more membranes may be separated by a plurality of spacers.

In an embodiment of the third aspect, the lower pressure is characteristic of atmospheric pressure at the surface.

In a fourth aspect, a water treatment system is provided comprising means for filtering a source water to produce a product water, the filtering means having a source water side and a product water side; and means for taking advantage of ambient pressure conditions in the shaft or tunnel below the ground and above the tunnel to create a pressure differential between the source water side and the product water side sufficient to induce permeate to cross from the source water side to the product water side.

In a fifth aspect, a filtration system is provided for producing product water from feed water, the system comprising at least one reverse osmosis membrane, wherein the membrane is configured to permit passage of water therethrough while restricting passage therethrough of one or more ions dissolved in the feed water, wherein the membrane is configured to be submerged at a depth in a shaft or tunnel containing feed water containing the ions dissolved therein, wherein a first side of the membrane is configured to be exposed to the feed water at a pressure characteristic of the submerged depth, and wherein a collector on a second side of the membrane is configured to be exposed to a pressure characteristic of atmospheric pressure at sea level, whereby, in use, a pressure differential across the membrane drives a reverse osmosis filtration process such that a permeate of a reduced dissolved ion concentration is obtained on the second side of the membrane, wherein a pump or impeller situated at the top of either the influent shaft or the effluent shaft replenishes the feed water effectively removing concentrate away from the membranes. The shaft or tunnel depth can vary based on the characteristics of the source and membrane used. If a single shaft configuration is employed baffling and pipes are used to direct concentrate flow back to the body of water aided by a pump or impeller.

In an embodiment of the fifth aspect, the system is configured to be submerged in a shaft or tunnel in the ground to a minimum depth of from about 113 meters to about 307 meters, wherein the seawater has a salinity of from about 20,000 to about 42,000 ppm.

In an embodiment of the fifth aspect, the system is configured to be permanently submerged in a shaft or tunnel in the ground to a depth of about 182 meters or less to about 732 meters or more.

In an embodiment of the fifth aspect, the system is configured to be submerged in a shaft or tunnel in the ground to a minimum depth of from about 247 meters to about 365 meters, wherein the seawater has a salinity of from about 33,000 to about 38,000 ppm.

In an embodiment of the fifth aspect, the system comprises a plurality of membranes, wherein each membrane is spaced apart from an adjacent membrane by at least about 50 mils (1.27 mm).

In an embodiment of the fifth aspect, the system comprises a plurality of membranes, wherein each membrane is spaced apart from an adjacent membrane by at least about 60 mils (1.52 mm).

In an embodiment of the fifth aspect, the system comprises a plurality of membranes, wherein each membrane is spaced apart from an adjacent membrane from about 60 mils (1.52 mm) to about 125 mils (3.18 mm).

In an embodiment of the fifth aspect, the system comprises a plurality of membranes, wherein each membrane is spaced apart from an adjacent membrane about a minimum of 70 mils (1.78 mm).

In an embodiment of the fifth aspect, the collector is exposed to a pressure characteristic of atmospheric pressure at sea level via a passageway.

In an embodiment of the fifth aspect, the passageway is a permeate collection tube or shaft for the advancement of permeate to the surface. The permeate collection tube or shaft can extend from about the submerged depth to at least a surface above the shaft or tunnel.

In an embodiment of the fifth aspect, the passageway comprises at least one space between two membranes.

In an embodiment of the fifth aspect, the system further comprises at least one membrane module, wherein the membrane module comprises one or more membranes and wherein, in use, permeate can be withdrawn through a permeate collection module.

In an embodiment of the fifth aspect, the system further comprises a channel configured to transport treated water to the surface.

In a sixth aspect, a filtration system for producing product water from feed water is provided, the system comprising at least one nanofiltration membrane, wherein the membranes is configured to permit passage of water therethrough while restricting passage therethrough of at least one constituent, wherein the membrane is configured to be submerged in the underground shaft or tunnel of feed water containing the constituents, wherein the depth is at least about 6 meters, wherein a first side of the membrane is configured to be exposed to the feed water at a pressure characteristic of the shaft or tunnel depth, and wherein a collector on a second side of each of the membrane is configured to be exposed to a pressure characteristic of atmospheric pressure at a surface, whereby, in use, a pressure differential across the membrane drives a filtration process such that a permeate having a reduced concentration of the constituent is obtained on the second side of the membrane.

In an embodiment of the sixth aspect, the depth is at least about 8 meters.

In an embodiment of the sixth aspect, the depth is at least about 10 meters.

In an embodiment of the sixth aspect, the pressure differential between the pressure characteristic of the flooded shaft or tunnel depth and the pressure characteristic of atmospheric pressure provides substantially all of the force driving the filtration process.

In an embodiment of the sixth aspect, the system further comprises a positive head pump configured to move permeate from the collector to the surface.

In a seventh aspect, a dual-pass system for desalination of water is provided, the system comprising a first pass filtration system, the first pass filtration system comprising at least one first nanofiltration membrane configured to permit passage of water therethrough while restricting passage of one or more dissolved ions therethrough, wherein the first membrane is configured to be submerged in a shaft or tunnel in fluid communication with a natural water body to a depth of at least about 113 meters, wherein a first side of the first membrane is configured to be exposed to the seawater at a pressure characteristic of the shaft or tunnel depth, and wherein a second side of the first membrane is configured to be exposed to a pressure characteristic of atmospheric pressure at sea level or an elevation higher than sea level, whereby, in use, a pressure differential across the first membrane drives a filtration process such that a permeate of reduced salinity is obtained on the second side of the first membrane; and a second pass filtration system, the second pass filtration system comprising at least one second membrane, wherein the second membrane is a nanofiltration membrane or a reverse osmosis membrane.

In an embodiment of the seventh aspect, a first side of the second membrane is configured to be exposed to the permeate of reduced salinity, and is configured such that, in use, a pressure differential is applied across the second membrane to drive a filtration process such that a permeate of further reduced salinity is obtained on the second side of the second membrane.

In an embodiment of the seventh aspect, the first-pass filtration system is configured to be submerged in a shaft or tunnel flooded with seawater to a depth of from about 152 meters to about 213 meters, the seawater having a salinity of from about 33,000 to 38,000 ppm.

In an embodiment of the seventh aspect, the system comprises a plurality of first nanofiltration membranes, wherein each of the first nanofiltration membranes is spaced apart from an adjacent membrane by about 50 mils (1.27 mm) or more.

In an embodiment of the seventh aspect, the system comprises a plurality of first nanofiltration membranes, wherein each of the first nanofiltration membranes is spaced apart from an adjacent membrane by about 60 mils (1.52 mm) or more.

In an embodiment of the seventh aspect, the system comprises a plurality of first nanofiltration membranes, wherein each of the first nanofiltration membranes is spaced apart from an adjacent membrane by from about 60 mils (1.52 mm) to about 90 mils (2.29 mm).

In an eighth aspect, a method for treating water is provided, the method comprising: submerging a membrane module in a source water to a submerged depth in a shaft or tunnel which is in fluid communication with a source body of water, the membrane module comprising at least one membrane unit, the membrane unit having a first side and a second side, wherein at least a portion of the second side is in fluid communication with a collector channel, and wherein the first side is exposed to the source water at a first pressure, wherein the first pressure is characteristic of the shaft or tunnel depth; exposing the collector channel to a second pressure, wherein the second pressure is sufficient to induce permeate to cross from the first side to the second side; and collecting permeate in the collector system. A pump or impeller along with a series of baffles and pipe moves and directs the concentrate back to the body of water.

In an embodiment of the eighth aspect, the second pressure is characteristic of atmospheric pressure at a surface of the source water or at an elevation higher than the surface above the shaft or tunnel.

In an embodiment of the eighth aspect, the membrane unit comprises at least one nanofiltration membrane. The membrane module can be submerged to a shaft or tunnel depth of at least about 6 meters, or to a shaft or tunnel depth of at least about 8 meters, or to a shaft or tunnel depth of at least about 10 meters, or to a shaft or tunnel depth of from about 12 meters to about 18 meters, or to a shaft or tunnel depth of at least about 30 meters, or to a shaft or tunnel depth of at least about 60 meters, or to a shaft or tunnel depth of about 60 meters, or to a shaft or tunnel depth of from about 60 meters to about 244 meters, or to a shaft or tunnel depth of from about 122 meters to about 152 meters, or to a shaft or tunnel depth of from about 152 meters to about 183 meters.

In an embodiment of the eighth aspect, the membrane unit comprises at least one reverse osmosis membrane. The membrane module can submerged to a shaft or tunnel depth of at least about 190 meters, or to a shaft or tunnel depth of at least about 244 meters, or to a shaft or tunnel depth of from about 259 meters to about 274 meters.

In an embodiment of the eighth aspect, the membrane unit comprises at least one ultrafiltration membrane. The membrane module can be submerged to a shaft or tunnel depth of at least about 6 meters, or to a shaft or tunnel depth of at least about 8 meters, or to a shaft or tunnel depth of at least about 10 meters, or to a shaft or tunnel depth of from about 12 meters to about 18 meters, or to a shaft or tunnel depth of at least about 22 meters, or to a shaft or tunnel depth of from about 22 meters to about 60 meters.

In an embodiment of the eighth aspect, the membrane unit comprises at least one microfiltration membrane. The membrane module can submerged to a shaft or tunnel depth of at least about 6 meters, or to a shaft or tunnel depth of at least about 8 meters, or to a shaft or tunnel depth of at least about 10 meters, or to a shaft or tunnel depth of from about 12 meters to about 18 meters.

In an embodiment of the eighth aspect, the membrane module is submerged to a shaft or tunnel depth of at least about 7 meters.

In a ninth aspect, a method for treating water is provided, the method comprising exposing at least one membrane situated in a shaft or tunnel to a hydrostatic pressure characteristic of a shaft or tunnel depth, the membrane having a concentrate side and a permeate side, wherein the permeate side is in fluid communication with a collector; exposing at least a portion of an interior of the collector to a pressure lower than the hydrostatic pressure in the shaft or tunnel, whereby permeate passes from the concentrate side to the permeate side of the membrane; and collecting permeate from the collector. Further a series of baffles and pipes diverts the concentrate back to the source body with a pump or impeller.

In an embodiment of the ninth aspect, the second pressure is characteristic of atmospheric pressure at the surface above the shaft or tunnel or at an elevation higher than that of the surface above the shaft or tunnel.

In an embodiment of the ninth aspect, the membrane functions as the collector.

In a tenth aspect, a method of treating water is provided, the method comprising submerging means for screening out at least one unwanted constituent from a source water, the screening means defining a source water side and a product water side, wherein the source water side is exposed to a hydrostatic pressure in a shaft or tunnel which is fluid communication with a source water body; exposing the product water side to a low pressure system, the low pressure system having a pressure lower than the hydrostatic pressure, whereby product water passes from the source water side to the product water side; and collecting the product water.

In an eleventh aspect, a method of manufacturing a water treatment module is provided, the method comprising attaching at least one source water spacer to a first membrane unit, the membrane unit comprising two membrane layers spaced apart by a permeate spacer layer, the first membrane unit having a sealed edge portion and an unsealed edge portion; attaching a second membrane unit to the source water spacer; and coupling a collector spacer to the unsealed edge portions of the first membrane unit and the second membrane unit, wherein the collector spacer is configured to form a watertight seal separating a source water side of the first membrane unit and the second membrane unit from a product water side of the first membrane unit and the second membrane unit.

In a twelfth aspect, a method for treating water is provided, the method comprising submerging a membrane module in a constructed shaft or tunnel, in fluid communication with a water body, to a submerged depth, the membrane module comprising at least one membrane unit, the membrane unit having a first side and a second side, wherein at least a portion of the second side is in fluid communication with a collector channel, and wherein the first side is exposed to the source water at a first pressure, wherein the first pressure is characteristic of the submerged depth; exposing the collector channel to a second pressure, wherein the second pressure is sufficient to induce permeate to cross from the first side to the second side; and collecting permeate in the collector system.

In a thirteenth aspect, a method for treating water is provided, the method comprising exposing at least one membrane situated in a shaft, in fluid communication with a body of water, to a hydrostatic pressure characteristic of an immersion depth of the membrane, the membrane having a concentrate side and a permeate side, wherein the permeate side is in fluid communication with a collector; exposing at least a portion of an interior of the collector to a pressure lower than the hydrostatic pressure, whereby permeate passes from the concentrate side to the permeate side of the membrane; and collecting permeate from the collector.

In an embodiment of the thirteenth aspect, the second pressure is characteristic of atmospheric pressure at the surface or at an elevation higher than that of the surface.

In a fourteenth aspect, a method of treating is provided, the method comprising submerging means for screening out at least one unwanted constituent from a source water, the screening means defining a source water side and a product water side, wherein the source water side is exposed to a hydrostatic pressure of the source water; exposing the product water side to a low pressure system, the low pressure system having a pressure lower than the hydrostatic pressure, whereby product water passes from the source water side to the product water side; and collecting the product water.

In another aspect, a water treatment system is provided, the system comprising a membrane module configured to be submerged in a constructed shaft or tunnel, that is in fluid communication with a water body, at a submerged depth, the membrane module comprising at least one membrane cartridge, the membrane cartridge comprising at least one membrane element, the membrane element having a first side and a second side, wherein the first side of the membrane element is exposed to the water to be filtered at a pressure characteristic of the submerged depth; a collector passageway configured to be submerged in the shaft or tunnel, wherein at least a portion of the collector passageway is in fluid communication with the second side of the membrane element where filtered water is collected; and a permeate passageway extending to a surface above the shaft, wherein a differential between the pressure characteristic of the submerged depth in the shaft and the pressure characteristic of atmospheric pressure at the surface or at an elevation higher than the surface causes permeate to flow from the first side of the membrane element to the second side of the membrane element.

In some aspects, the permeate passageway is configured to expose an interior of the collector passageway to a pressure characteristic of atmospheric pressure at the surface or at an elevation higher than the surface of the body of water. In some aspects, the system further comprises a pump oriented between the collector passageway and the permeate passageway, wherein the pump causes permeate to flow in the direction of the surface. In some aspects, the membrane module comprises at least one feed spacer, wherein the membrane element is in a spiral wound format. In some aspects, the membrane element is a reverse-osmosis or nanofiltration membrane element. In some aspects, the membrane element feed spacer is at least about 50 mils (1.27 mm) thick. In some aspects, the membrane element feed spacer at least about 60 mils (1.52 mm) thick. In some aspects, the membrane element feed spacer at least about 70 mils (1.78 mm) thick. In some aspects, the membrane element feed spacer at least about 90 mils (2.29 mm) thick. In some aspects, the differential between the pressure characteristic of the submerged depth in a shaft or tunnel and the pressure characteristic of atmospheric pressure at the surface provides substantially all of the force driving the filtration process, in the absence of a mechanical device to increase the pressure to which the first side of the membrane is exposed, and in the absence of a mechanical device to reduce the pressure to which the second side of the membrane is exposed. In some aspects, the membrane module is configured to be submerged to a depth of from about 188 meters to about 375 meters. In some aspects, the membrane module is configured to be submerged to a depth of from about 6 meters to about 30 meters.

In another aspect, a water treatment system is provided, comprising a shaft configured to be submerged to a depth and flooded with water to be treated, the water having a first pressure at the submerged depth; an inflow tube disposed within the shaft; at least one membrane disposed with the inflow tube, the membrane having a concentrate side and a permeate side; a plurality of guides aligned with a vertical length of the shaft; a collector in fluid communication with the permeate side of the membrane; and a passageway configured to expose an interior of the collector to a second pressure which is lower than the first pressure, wherein exposing the concentrate side of the membrane to the first pressure drives a filtration process in which permeate moves across the membrane from the concentrate side to the permeate side. In some aspects, the system further comprises a pump oriented between the collector and the passageway, wherein the pump causes permeate to flow in the direction of the surface. In some aspects, the system further comprises a pump well housing the pump, the pump well further comprising a pipe extending from the pump and connecting with the passageway. In some aspects, the guides are continuous along the length of the shaft. In some aspects, the guides comprise a plurality of segments along the length of the shaft, each segment configured to engage an adjacent segment. In some aspects, the guides are located between the shaft and the inflow tube. In some aspects, the at least one membrane is a spiral wound membrane that is wrapped around the passageway.

In yet another aspect, a method for treating water is provided, the method comprising submerging a membrane module in a constructed shaft or tunnel, in fluid communication with a water body, to a submerged depth, the membrane module comprising at least one membrane unit, the membrane unit having a first side and a second side, wherein at least a portion of the second side is in fluid communication with a collector channel, and wherein the first side is exposed to the source water at a first pressure, wherein the first pressure is characteristic of the submerged depth; exposing the collector channel to a second pressure, wherein the second pressure is sufficient to induce permeate to cross from the first side to the second side; and collecting permeate in the collector system. In some aspects, the second pressure is characteristic of atmospheric pressure at the surface or at an elevation higher than that of the surface.

BRIEF DESCRIPTION OF THE DRAWINGS

FIG. 6A provides a diagram (not to scale) of a membrane element cluster.

FIG. 6B provides a perspective view (not to scale) of the membrane element cluster of FIG. 6A.

DETAILED DESCRIPTION OF THE PREFERRED EMBODIMENT

Figure 1:
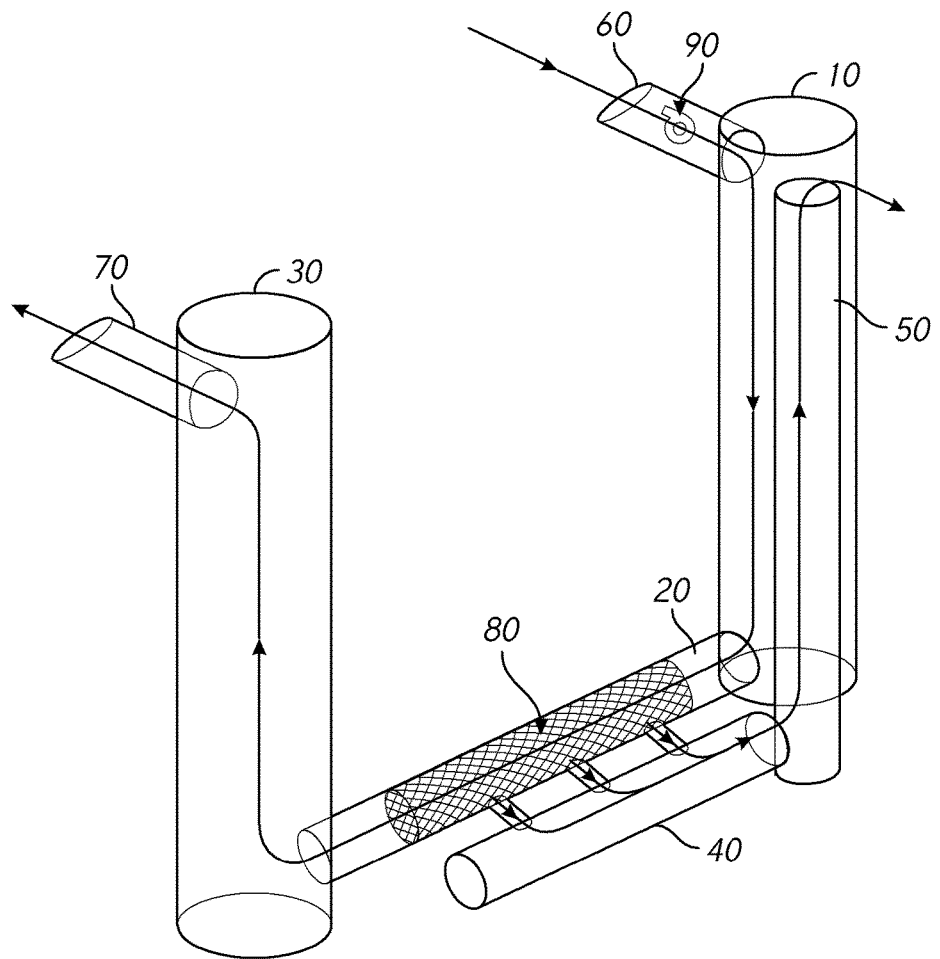
FIG. 1 provides a diagram (not to scale) of a system for processing saltwater, wherein two parallel shafts are connected by a membrane filter.

The following description and examples illustrate preferred embodiments of the present invention in detail. Those of skill in the art will recognize that there are numerous variations and modifications of this invention that are encompassed by its scope. Accordingly, the description of a preferred embodiment should not be deemed to limit the scope of the present invention.

Conventional reverse osmosis desalination plants expose reverse osmosis membranes to high-pressure saltwater. This pressure forces water through the membrane while preventing (or impeding) passage of ions, selected molecules, and particulates therethrough. Desalination processes are typically operated at a high pressure and low recovery, and thus have a high energy demand. Various desalination systems are described in U.S. Pat. No. 3,060,119 (Carpenter); U.S. Pat. No. 3,456,802 (Cole); U.S. Pat. No. 4,770,775 (Lopez); U.S. Pat. No. 5,229,005 (Fok); U.S. Pat. No. 5,366,635 (Watkins); and U.S. Pat. No. 6,656,352 (Bosley); and U.S. Patent Application No. 2004/0108272 (Bosley); the disclosures of each of which are hereby incorporated by reference in their entireties.

Systems are provided for purifying and/or desalinating water. The systems involve exposure of one or more membranes, such as nanofiltration (NF) or reverse osmosis (RO) membranes, to the hydrostatic pressure of an induced water column, for example, in a near shore shaft or tunnel constructed at a depth to mimic the pressure required to induce the treatment. If a tunnel is provided it is in fluid communication with a shaft which is in fluid communication with a water body. The membrane is submerged to a shaft or tunnel depth where the pressure is sufficient to overcome the sum of the osmotic pressure of the feed water (or raw water) that exists on the first side of the membrane and the transmembrane pressure loss of the membrane itself. For seawater or other water containing higher amounts of dissolved salts, transmembrane pressure losses are typically much smaller than the osmotic pressure. Thus, in some applications, osmotic pressure is a more significant driver than transmembrane pressure losses in determining the required pressure (and thus, the required tunnel/shaft depth). In treatment of fresh surface water or water containing lower amounts of dissolved salts, osmotic pressures tend to be lower, and the transmembrane pressure losses become a more significant factor in determining the required pressure (and thus, the required shaft/tunnel depth). Typically, systems adapted for desalinating seawater require greater pressures, and thus greater shaft/tunnel depths, than do systems for treating freshwater. Further, a series of baffles are positioned in the shaft or tunnel to direct the concentrate away from the membrane elements and back to the water body. A pump or impeller is provided to move the concentrate and feed water.

The systems of preferred embodiments utilize membrane modules of various configurations. In a preferred configuration, the membrane module employs a membrane system wherein two parallel membrane sheets are held apart by permeate spacers, and wherein the volume between the membrane sheets is enclosed. Permeate water passes through the membranes and into the enclosed volume, where it is collected. Particularly preferred embodiments employ rigid separators to maintain spacing between the membranes on the low pressure (permeate) side; however, any suitable permeate spacer configuration (e.g., spacers having some degree of flexibility or deformability) can be employed which is capable of maintaining a separation of the two membrane sheets. Particularly preferred embodiments employ spacers that are ribbed vertically or corrugated vertically. The spacers are preferably configured to space apart adjacent membranes by between 70 mils (1.87 mm) to 250 mils (6.35 mm). The size of spacing and vertical ribbing or corrugation can promote unrestricted flow. However, the spacers can have any suitable shape, form, or structure capable of maintaining a separation between membrane sheets, e.g., square, rectangular, or polygonal cross section (solid or at least partially hollow), circular cross section, I-beams, and the like. Spacers can be employed to maintain a separation between membrane sheets in the space in which permeate is collected (permeate spacers), and spacers can maintain a separation between membrane sheets in the area exposed to raw or untreated water (e.g., raw water spacers). Separation can also be provided by, e.g., a series of spaced expanded plastic media (e.g., spheres), corrugated woven plastic fibers, porous monoliths, nonwoven fibrous sheets, or the like. Similarly, the spacer can be fabricated from any suitable material. Suitable materials can include rigid polymers, ceramics, stainless steel, composites, polymer coated metal, and the like. As discussed above, spacers or other structures providing spacing are employed within the space between the two membrane surfaces where permeate is collected (e.g., permeate spacers), or between membrane surfaces exposed to raw water (e.g., raw water spacers).

Alternatively, one or more spiral-wound membrane units can be employed in a loosely rolled configuration wherein the feed water spacers are significantly wider than usual to allow for the passage of small suspended solids and to minimize longitudinal head loss. The membrane elements can alternatively be arrayed in various other configurations (planar, spiral, curved, corrugated, etc.) which maximize surface exposure and minimize space requirements. In seawater applications, the hydrostatic pressure characteristic of the shaft/tunnel depth forces water through the membrane, and a gathering system collects the treated water and pumps it to the surface, to shore, or to any other desired location. If a spiral-wound configuration is employed, the membranes are preferably spaced farther apart than in a conventional reverse osmosis system, e.g., about 90 mils (2.29 mm), 125 mils (3.18 mm) or more. Such a configuration facilitates the flow of feed water past the membranes, and especially facilitates the passage off small suspended solids to eliminate or minimize the need to pre-treat the water. While an open configuration is typically preferred, in certain embodiments a configuration other than an open configuration can be desirable. For example, if a beach well is provided as an intake it will screen out most all suspended matter in which case a tighter element configuration is warranted (i.e., the standard 28 mil (0.71 mm) feed spacer in a spiral element).

Instead of trying to force the water through a small channel, the membranes in the system, by virtue of the wide specially designed spacers, have a much larger channel (increased spacing between membranes) reducing the associated friction loss. In addition, the membranes are oriented vertically to allow gravity to assist this flow. As the concentration of the seawater on the high-pressure side of the membrane increases, so does its density due to incremental increase in salinity as fresh water is extracted. Since the more dense water is slightly heavier, gravity (g) will induce a flow of the dense water from top to bottom.

The natural mixing effect will pull the extra concentration of dissolved solids away from the face of the membranes. When some product water penetrates the membrane, the feed water right on the face of the membrane is temporarily concentrated. As all solutions in nature seek equilibrium with regard to concentration (like a gas filling its container), the concentrated water right at the point of production will 'jump' away from the membrane to mix with the lower concentration water in the middle of the channel between the membranes.

The combination of these three effects, downward water flow, the gravity pulling down the higher density water and the mixing effect pulling toward the middle of the channel, will pull the flow in a vector away from the membrane and down toward the floor of the well bore then back up through the outlet. As the water moves down and out of this space, more feed water will enter from the top in a constant circulation.

The systems of preferred embodiments offer the advantage of eliminating or greatly reducing the need to pressurize the feed or raw water by lowering the membranes into constructed shafts or tunnels at depths of from about 194 meters to about 307 meters or more. Conventional land-based reverse osmosis processes typically require tremendous amounts of energy to generate this pressure. Preferably, the shaft/tunnel depth employed in the systems of preferred embodiments using reverse osmosis membranes is from about 247 meters to about 274 meters, or as much as 365 meters or more, when it is desired to produce potable water from seawater of average salinity (e.g., water from the Pacific Ocean having a salinity of about 35,000 mg/liter); most preferably the shaft/tunnel depth is about 259 meters. Of course, systems using nanofiltration membranes can also be deployed at shallower depths. If reduced salinity water (e.g., brackish water suitable for irrigation, industrial cooling use, or the like) is desired, the preferred shaft/tunnel depth for systems using nanofiltration membranes is from about 113 meters to about 247 meters or more. Preferably, the shaft/tunnel depth is from about 152 meters to about 213 meters to produce brackish water from seawater of average salinity (e.g., water from the Pacific Ocean having a salinity of about 35,000 ppm or mg/L). Of course, systems using nanofiltration membranes can also be deployed at greater shaft/tunnel depths than 213 meters; such systems can be deployed at the same depths as those employing reverse osmosis membranes.

The preferred shaft/tunnel depth can depend on a variety of factors, including but not limited to membrane chemistry, membrane spacing, ambient currents, salinity of the seawater (or dissolved ion content of the feed water), salinity of the permeate (or dissolved ion content of the permeate), overall treated water recovery, and the like. At depth in the shaft or tunnel, the seawater in contact with the membranes is naturally at a continual high pressure. Other advantages of the systems of preferred embodiments are that they do not require high pressure pipes, water pre-treatment systems, or brine disposal systems. The systems of preferred embodiments can also be deployed at even shallower shaft/tunnel depths. For example, embodiments can be deployed in shallower shafts with ocean water for use in desalination pretreatment systems or ocean water intake systems. Selected systems of preferred embodiments are preferably configured such that saltwater does not come into contact with any interior metallic components, dramatically mitigating the corrosive effects of selected dissolved ions that affect conventional reverse osmosis systems. While it is generally preferred to operate the systems of preferred embodiments at shaft/tunnel depths of 247 meters to about 365 meters, systems can advantageously be configured for operation at shallower shaft/tunnel depths. For example, systems including microfiltration, ultrafiltration, or nanofiltration membranes can be positioned in low salinity well shafts at much shallower depths and configured to filter out bacteria, viruses, organics, and inorganics from a freshwater source. Most preferably, surface water treatment systems employ nanofiltration membranes. The membranes of such systems can be positioned at a shaft/tunnel depth of about 6 meters to 61 meters, or at any other appropriate depth, depending upon the total dissolved solids to be removed, the desired intake velocity, and the desired quality of the product water. For some embodiments, especially the embodiments of the system discussed below, the system could be used with other water sources such as springs, rivers, lakes, etc. since the depth of the body of water is not a factor affecting use of the system. The depth of the shaft/tunnel/well will vary depending on the total dissolved solids of the water source and the type of membrane used (nanofiltration, reverse osmosis, etc.). For example, for use with spring water, a very loosely spaced nanofiltration membrane could be used for higher flux (up to four times higher than previous systems) and higher recovery due to the lower salinity of the discharge water.

The collection system can be connected to one or more pipes, tubes, passageways or other flow directing means, such as one through which permeate water is directed to the surface, or other desired location; and one of which isolates (or protects) the membranes from the pump operation. The pressure surge in the system caused by turning the pump on or off can be relieved by a passageway emptying or filling rather than by suddenly increasing or decreasing the pressure differential across the membranes. Without protecting a membrane from pump cycling, the stress on the membrane unit due to pump cycling (e.g., for system maintenance) can decrease membrane life or cause other mechanical wear. While it is particularly preferred to employ a permeate passageway to expose the permeate holding tank to atmospheric pressure, and thereby allow the flow of permeate water through the membrane when exposed to pressure at depth in the shaft, other means of applying a reduced pressure to the permeate side of the membranes can also be employed to drive the filtration process. Multiple flow directing means can advantageously be employed (e.g., multiple pipes to send permeate water to a single location or to different locations, etc.).

Desalination plants often add certain chemicals (e.g., chlorine, fluorine, algaecides, antifoams, biocides, boiler water chemicals, coagulants, corrosion inhibitors, disinfectants, flocculants, neutralizing agents, oxidants, oxygen scavengers, pH conditioners, resin cleaners, scale inhibitors, and the like) to the desalinated water, depending on local regulations. This activity can take place on the surface above the shaft or tunnel as the water is being delivered to the distribution system or at any other suitable place in the system.

Depth Exposed Membrane for Water Extraction System

The basic components of the system of a preferred embodiment include a cartridge module, a well bore, an inner tube, a permeate tube, an electrical and control umbilical cord, and ancillary systems. The cartridge module, in a preferred embodiment, is composed of membrane cartridges, permeate tube interface, and a submersible permeate pump. The well bore is cased to variable depths and diameters and source water and product water dependent. The well bore is the basic structure that connects to the outflow pipe, which is lower in elevation than the inner tube inflow pipe. The inner tube is a tube open at both top and bottom and feeding source water through the inflow pipe that is at a higher elevation than the well bore outflow pipe. This provides the moving water column, generating the necessary pressure differential to drive the reverse osmotic action. The permeate tube is a small diameter tube located within the inner tube to transport permeate to ground level storage tanks or a municipal water utility. In some embodiments, as discussed in further detail below, the membrane elements may be wrapped around the permeate tube. Power for the pump and an instrumentation cable to provide control of the pump and system monitoring may be provided by the electrical and control umbilical cord. Additional systems, such as power source monitoring instruments, cleaning/fouling preventions systems, etc. may be provided in some embodiments.

A diagram of a system of a preferred embodiment is shown in FIG. 1. In this embodiment two vertical shafts are joined by a tunnel containing the membrane elements. The influent shaft 10 is connected to the body of water by an influent tunnel 60. Near the bottom of the influent shaft 10 is the membrane tunnel 20 joined at its other end with the effluent shaft 30. The effluent shaft 30 is joined to the body of water by the effluent tunnel 70. The membrane elements are contained in the membrane tunnel 20 and transmit the permeate to the wet well 40. From the wet well 40 the permeate is pumped to the surface via the permeate shaft 50. The permeate shaft 50 can either be a separate shaft or a sealed pipe within either the influent shaft 10 or effluent shaft 30. The system has a feed water pump 90 that can either be in the influent tunnel 60 or the effluent tunnel 70.

Figure 2:
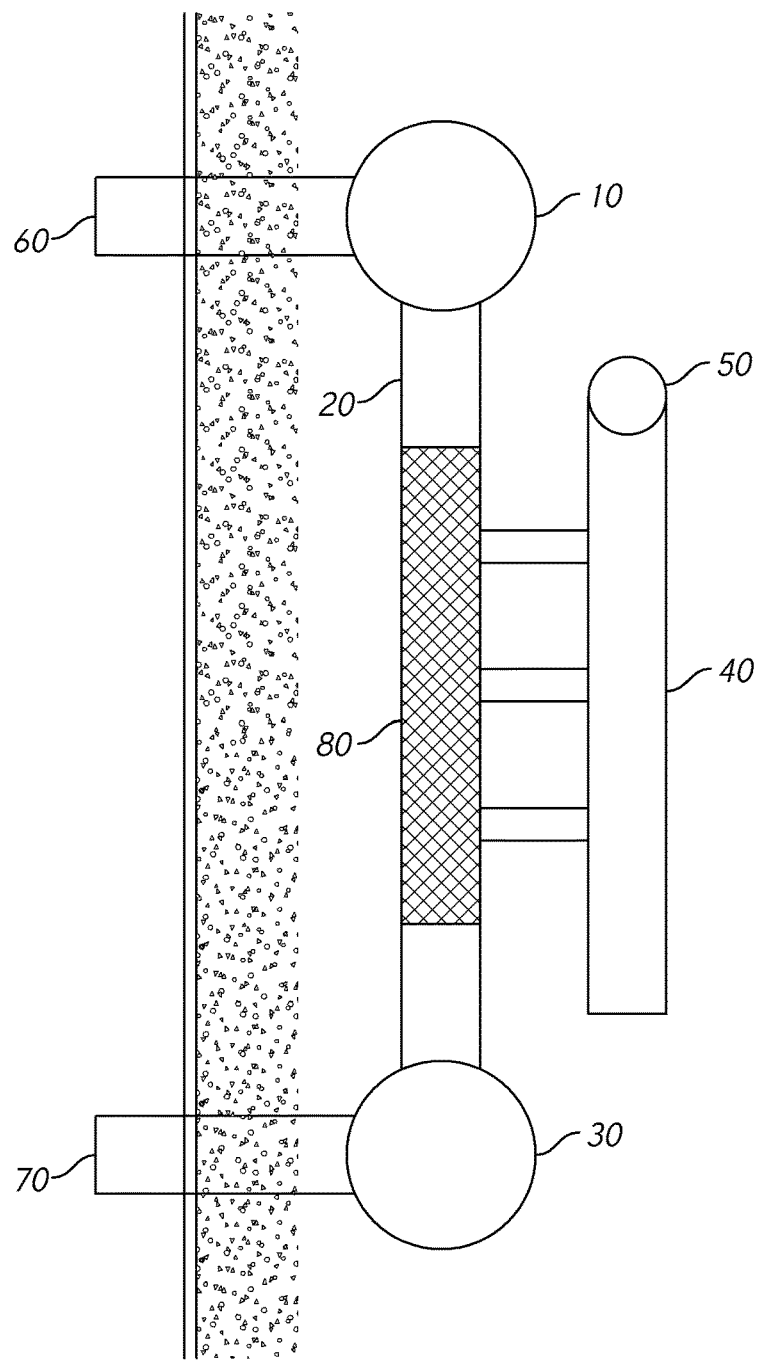
FIG. 2 provides a plan view diagram (not to scale) of the system of FIG. 1, wherein an influent trench or tunnel and brine trench or tunnel are situated in a spaced apart configuration along a coastline, in fluid communication with a membrane filter.

FIG. 2 shows a plan view of the system described in FIG. 1. All labels correspond to those in FIG. 1 but in plan view.

Figure 3:
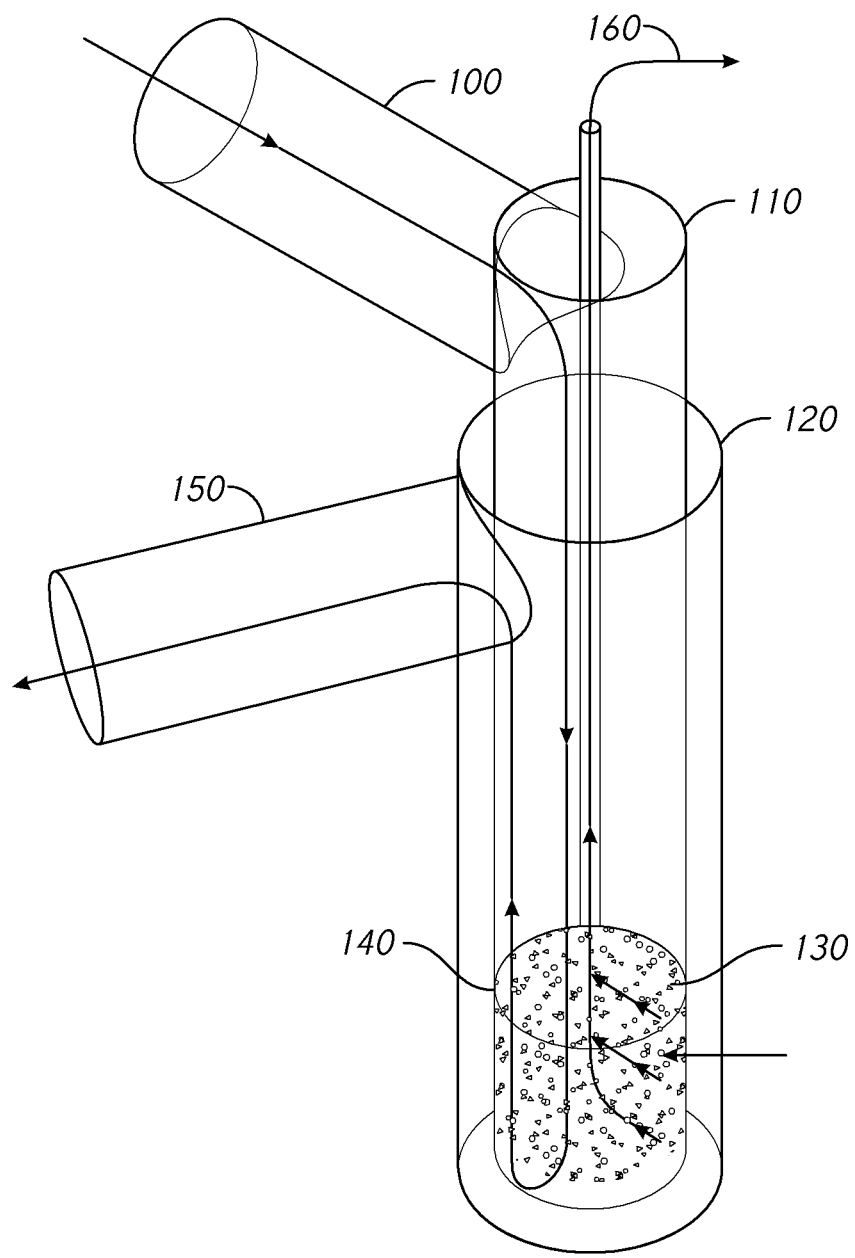
FIG. 3 provides a diagram (not to scale) of two coaxial shafts, wherein the inner shaft is in fluid connection with saltwater influent and wherein the outer shaft provides egress for brine to the ocean.

A diagram of a preferred embodiment of a single shaft system is shown in FIG. 3. In this embodiment the shaft 120 is flooded through an influent tunnel 100 from the water body. The interior baffle 110 contains the membrane elements 130 and separates the return flow of the concentrate 140 out the concentrate tunnel 150. In some embodiments, the interior baffle 110 is open at both the top and the bottom. The permeate is pumped from the wet well (not shown) to the surface 160. The influent tunnel/trench 100 is constructed at an angle to the effluent tunnel/trench 150 so the concentrate will not influence the feed water. Ideally the two tunnels are constructed with ambient currents in mind so the concentrate is driven away from the influent tunnel/trench 100. So if the ambient current runs north to south the effluent trench or tunnel will be the southernmost.

Figure 4:
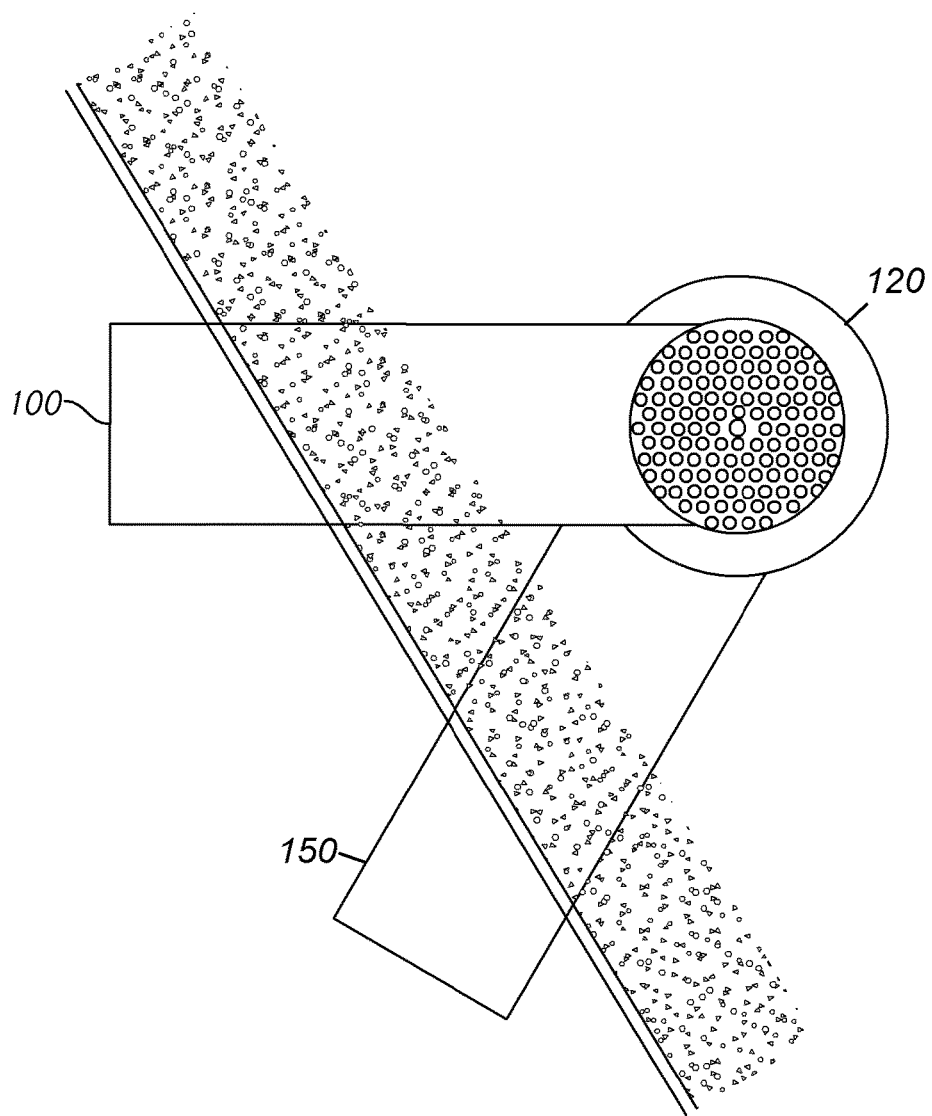
FIG. 4 provides a plan view diagram (not to scale) of a system as in FIG. 3, wherein the saltwater influent shaft and brine egress shaft are spaced apart along a coastline.

FIG. 4 shows a plan view of the system described in FIG. 3. All labels correspond to those in FIG. 3 but in plan view.

Figure 5A:
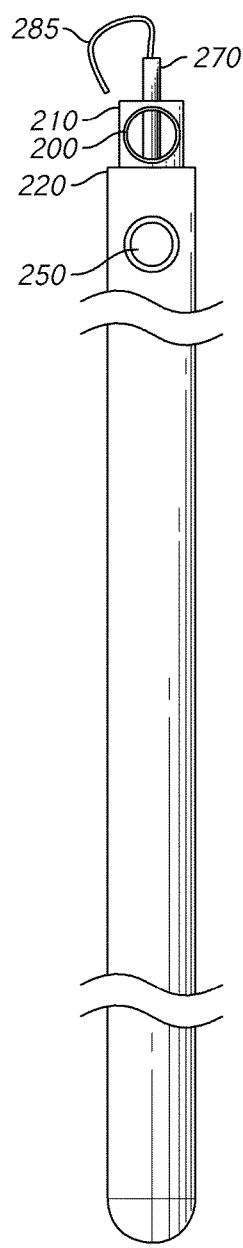
FIG. 5A provides a diagram (not to scale) of a filtration system.
Figure 5B:
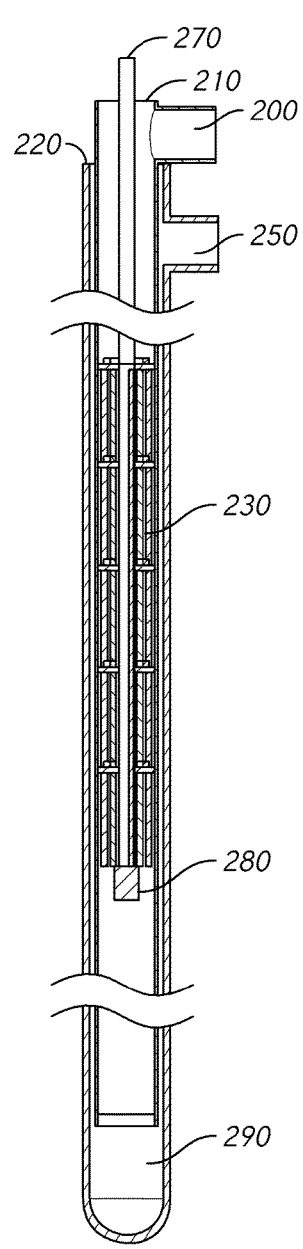
FIG. 5B provides a cross-sectional view (not to scale) of the diagram of FIG. 5A.
Figure 5C:
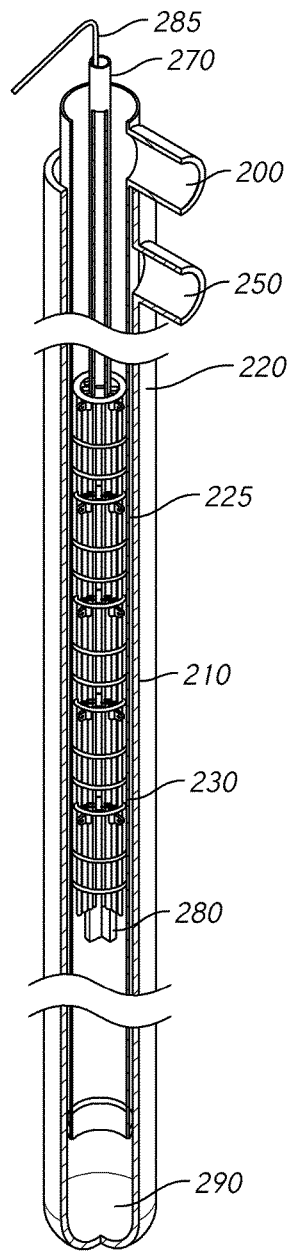
FIG. 5C provides a perspective cross-sectional view (not to scale) of the diagram of FIG. 5A.

FIGS. 5A-C show the single shaft system. FIG. 5B shows a cross-sectional view of the system described in FIG. 5A. FIG. 5C shows a perspective cross-sectional view of the system described in FIG. 5A. In this embodiment, the shaft 220 is flooded through an influent tunnel 200 from the body of water. The shaft 220 can comprise any suitable material. For example, the shaft 220 can comprise coated carbon steel, stainless steel, plastic, polyvinyl chloride (PVC), high-density polyethylene (HDPE), rigid polymers, polymer coated metals, composite materials, concrete, copper-nickel alloys, titanium alloys, austenitic nickel cast iron alloys, aluminum-bronze alloys, or nickel-aluminum bronze alloys. The internal diameter of the shaft 220 can range from as little as 8 or less inches to as much as 108 or more inches. The internal diameter of the shaft 220 can be at least 16 inches, or at least 32 inches, or at least 54 inches, or from 16 to 54 inches, or from 16 to 32 inches, or from 32 to 54 inches. In some embodiments, the shaft 220 can comprise a plurality of interlocking components. The shaft 220 may be pre-formed or may be formed in place. The components may be connected using any suitable fasteners. For example, the components may be connected through screws, bolts, rivets, hooks, anchors, nails, or staples. Alternatively, the components may be welded or may comprise threaded sections to engage adjacent components.

An inflow tube 210 within the shaft 220 contains the membrane element clusters 230 and separates the return flow of the concentrate out of the concentrate tunnel 250. The inflow tube 210 can comprise any suitable material. For example, the inflow tube 210 can comprise coated carbon steel, stainless steel, plastic, polyvinyl chloride (PVC), high-density polyethylene (HDPE), rigid polymers, polymer coated metals, composite materials, concrete, copper-nickel alloys, titanium alloys, austenitic nickel cast iron alloys, aluminum-bronze alloys, or nickel-aluminum bronze alloys. The inflow tube 210 can have an internal diameter ranging from as little as 6 or less inches to as much as 88 or more inches. The internal diameter of the inflow tube 210 can be at least 12 inches, or at least 26 inches, or at least 26 inches, or at least 44 inches. The inflow tube 210 can contain as many as 80 or more membrane element clusters 230 or as few as 1 membrane element cluster 230. The inflow tube 210 can contain at 10 or less membrane element clusters 230, or at least 10 membrane element clusters 230, or at least 20 membrane element clusters 230, or at least 30 membrane element clusters 230, or at least 40 membrane element clusters 230, or between 10 to 30 membrane element clusters 230, or between 30 and 50 membrane element clusters 230. The membrane element clusters 230 may be positioned at a depth of between 500 feet or less and 2400 feet or more. The membrane element clusters 230 can be positioned at a depth of at least 500 feet, or at least 1,000 feet, or at least 1,100 feet, or at least 1,200 feet, or at least 1,500 feet, or at least 1,800 feet, or at least 2,100 feet, or at least 2,400 feet, or between 500 and 1,000 feet, or between 1,000 and 1,100 feet, or between 1,100 and 1,200 feet, or between 1,200 and 1,500 feet, or between 1,500 and 1,800 feet, or between 1,800 and 2,100 feet, or between 2,100 and 2,400 feet.

The single shaft system further includes vertical guides 225. The shaft 220 can house between 1 and 100 or more vertical guides 225. The shaft 220 can house at least 10 vertical guides 225, or at least 20 vertical guides 225, or at least 30 vertical guides 225, or at least 40 vertical guides 225, or at least 50 vertical guides 225, or at least 60 vertical guides 225, or at least 70 vertical guides 225, or at least 80 vertical guides 225, or at least 90 vertical guides 225, or at least 100 vertical guides 225, or between 1 and 20 vertical guides 225, or between 20 and 40 vertical guides 225, or between 40 and 60 vertical guides 225, or between 60 and 80 vertical guides 225, or between 80 and 100 vertical guides 225. The vertical guides 225 can comprise any suitable material. For example, the vertical guides 225 can comprise coated carbon steel, stainless steel, plastic, polyvinyl chloride (PVC), high-density polyethylene (HDPE), rigid polymers, polymer coated metals, composite materials, concrete, copper-nickel alloys, titanium alloys, austenitic nickel cast iron alloys, aluminum-bronze alloys, or nickel-aluminum bronze alloys. The vertical guides 225 can be solid. Alternatively, the vertical guides 225 can be hollow. In some embodiments, the vertical guides 225 can comprise both solid and hollow sections. The vertical guides 225 may be continuous along the length of the shaft 220. Alternatively, the vertical guides 225 may comprise a plurality of segments along the length of the shaft 220. The plurality of segments may be configured to engage each other. The plurality of segments may be configured to interlock. The plurality of segments may be configured to connect using any suitable fastener. For example, the plurality of fasteners may be configured to connect using screws, bolts, rivets, hooks, anchors, nails, or staples. Alternatively, the plurality of segments can be welded or can comprise threaded sections to engage adjacent segments. Alternatively, the plurality of segments of the vertical guides 225 may be spaced apart. The spacing between the plurality of segments can range from 1 inch or less to 2 feet or more. The spacing between the plurality of segments can be at least 2 inches, or at least 4 inches, or at least 6 inches, or at least 8 inches, or at least 12 inches, or at least 18 inches, or at least 2 feet, or between 2 and 8 inches, or between 8 and 12 inches, or between 12 and 18 inches, or between 18 and 24 inches. The vertical guides 225 may be located between the shaft 220 and the inflow tube 210 or on the interior surface of the inflow tube 210. The total length of the shaft 220 spanned by the vertical guides 225 can be between 1 or fewer feet and 40 or more feet. The total length of the shaft 220 spanned by the vertical guides 225 can be at least 10 feet, or at least 20 feet, or at least 30 feet, or between 10 and 30 feet, or between 10 and 20 feet, or between 20 and 30 feet. The vertical guides 225 may have any suitable cross-section. For example, the cross section can be circular, triangular, quadrilateral, or polygonal.

The permeate is pumped to the surface through the permeate collection tube 270 by the submersible pump 280. The permeate collection tube 270 can comprise any suitable material. For example, the permeate collection tube 270 can comprise coated carbon steel, stainless steel, titanium, plastic, polyvinyl chloride (PVC), high-density polyethylene (HDPE), rigid polymers, polymer coated metals, composite materials, concrete, copper-nickel alloys, titanium alloys, austenitic nickel cast iron alloys, aluminum-bronze alloys, or nickel-aluminum bronze alloys. The permeate collection tube 270 can have an internal diameter of between 2 inches or less and 24 inches or more. The permeate collection tube 270 can have an internal diameter of at least 4 inches, or at least 8 inches, or at least 12 inches, or at least 16 inches, or at least 24 inches, or between 2 and 4 inches, or between 4 and 8 inches, or between 8 and 12 inches, or between 12 and 16 inches, or between 16 and 24 inches. The permeate collection tube 270 have a rating from 300 psi or less to 1600 psi or more. The permeate collection tube 270 can have a rating of at least 300 psi, or at least 400 psi, or at least 500 psi, or at least 600 psi, or at least 700 psi, or at least 800 psi, or at least 900 psi, or at least 1,000 psi, or at least 1,100 psi, or at least 1,200 psi, or at least 1,300 psi, or at least 1,400 psi, or at least 1,500 psi, or at least 1,600 psi, or between 300 and 600 psi, or between 600 and 900 psi, or between 900 and 1,200 psi, or between 1,200 and 1,600 psi.

The submersible pump 280 can be located below the membrane element clusters 230. Alternatively, the submersible pump 280 can be located above the membrane element clusters 230, or between several membrane element clusters 230, or to the side of the membrane element clusters 230, or exterior to the outer surface of the shaft 220. In some embodiments, the submersible pump 280 can comprise a plurality of pumps that can be located in one or more locations. The submersible pump 280 can comprise a single stage or a multi-stage submersible pump. The submersible pump 280 can comprise a bladder pump, or a grinder pump, or a well pump, or a borehole pump, or a fountain pump, or a utility pump. The submersible pump 280 may provide exposure to atmospheric pressure, allowing for a differential between the pressure characteristic of the submerged shaft or tunnel depth and the pressure characteristic of atmospheric pressure at the surface of the body of water. The pressure differential may be at least partially responsible for driving the filtration process.

The submersible pump 280 receives power from the submersible pump power cord 285. The submersible pump power cord 285 extends from the surface level to the submersible pump 280. The submersible pump power cord 285 may extend through the permeate collection tube 270 to the submersible pump 280. Alternatively, the submersible pump power cord 285 can extend between the inflow tube 210 and the membrane element clusters 230, or through one or more sections of the membrane element clusters 230, or between the inflow tube 210 and the interior surface of the shaft 220, or along the exterior of the shaft 220. The submersible pump power cord 285 may be attached to one or more surfaces of the system. The submersible pump power cord 285 can be attached through banding or clamping. The submersible pump power cord 285 may have either a flat or round configuration and may contain insulation materials, such as polypropylene or ethylene diene monomer synthetic rubber, and metal armor materials, such as galvanized steel.

In an illustrative embodiment, the single shaft system can be integrated into a well having a depth between 600 feet or less to 2,400 feet or more. The well depth can be at least 600 feet, or at least 1,200 feet, or at least 1,400 feet, or at least 2,400 meters, or between 600 and 1,200 feet, or between 1,200 and 1,400 feet, or between 1,400 meters and 2,400 feet. The shaft 220 may be oriented so that the length of the shaft runs perpendicular to the surface. Alternatively, the shaft 220 can be oriented at least 15°, or at least 30°, or at least 45°, or at least 60°, or at least 75°, or at least 90°, or less than 90°, or between 0° and 15°, or between 15° and 30°, or between 30° and 45°, or between 45° and 60°, or between 60° and 75°, or between 75° and 90° from an axis running perpendicular to the surface.

The influent tunnel 200 and concentrate tunnel 250 can be oriented perpendicular to the shaft 220. Alternatively, one or more of the influent tunnel 200 and the concentrate tunnel 250 can be angled at least 15°, or at least 30°, or at least 45°, or at least 60°, or at least 75°, or at least 90°, or less than 90°, or between 0° and 15°, or between 15° and 30°, or between 30° and 45°, or between 45° and 60°, or between 60° and 75°, or between 75° and 90° from the surface of the shaft 220. The influent tunnel 200 can be constructed at an angle to the concentrate tunnel 250 so the concentrate will not influence the feed water. The influent tunnel 200 can be constructed at an angle to the concentrate tunnel 250 of at least 15°, or at least 30°, or at least 45°, or at least 60°, or at least 75°, or at least 90°, or less than 90°, or at least 105°, or at least 120°, or at least 135°, or at least 150°, or at least 165°, or at least 180°, or between 0° and 15°, or between 15° and 30°, or between 30° and 45°, or between 45° and 60°, or between 60° and 75°, or between 75° and 90°, or between 90° and 105°, or between 105° and 120°, or between 120° and 135°, or between 135° and 150°, or between 150° and 165°, or between 165° and 180°, or between 90° and 180°. The two tunnels can be constructed with ambient currents in mind so the concentrate is driven away from the influent tunnel 200. So if the ambient current runs north to south the concentrate tunnel can be the southernmost. The vertical distance between the center of influent tunnel 200 and the concentrate tunnel 250 can be between 5 feet or less to 20 feet or more. The vertical distance between the center of influent tunnel 200 and the concentrate tunnel 250 can be at least 5 feet, or at least 10 feet, or at least 20 feet, or between 5 and 10 feet, or between 10 and 20 feet. The height differential between the influent tunnel 200 and the concentrate tunnel 250 can be at least partially responsible for the circulation of feed water or removal of concentrate from the system. Feed water may be introduced into the influent tunnel 200 through a natural water source such as tide or river flow. Alternatively, feed water may be introduced to the influent tunnel 200 through the action of a pump, such as a low-head high-capacity pump. The pump may be positioned exterior to the influent tunnel 200. Alternatively, the pump may be positioned in the influent tunnel 200, in the inflow tube 210, or in any other suitable location in the system. The influent tunnel 200 can be positioned from between 5 feet or less and 20 feet or more above ground level. The influent tunnel 200 can be at least 5 feet above ground level, or at least 10 feet above ground level, or at least 20 feet above ground level, or at between 5 and 10 feet above ground level, or between 10 and 20 feet above ground level.

The single shaft system may also include a debris collection recess 290 at the bottom of the shaft 220. The debris collection recess 290 can have a depth of between 25 feet or less to 100 feet or more. The debris collection recess 290 can have a depth of at least 25 feet, or at least 50 feet, or at least 100 feet, or between 25 and 50 feet, or between 50 and 100 feet.

In some embodiments, feed water may undergo pretreatment prior to entering the influent tunnel 200. Pretreatment can include sand filtration, candle filtration, ultrafiltration, microfiltration, coagulation and flocculation.

FIGS. 6A-B show a cross-section of the system depicted in FIGS. 5A-C showing the structure of an individual membrane element cluster 230 within the inflow tube 210. The membrane element cluster 230 includes an element cluster strapping 232 that forms that outer boundary of the membrane element cluster 230 and provides structural support to a plurality of membrane elements 234. The element cluster strapping 232 may comprise coated carbon steel, stainless steel, plastic, polyvinyl chloride (PVC), high-density polyethylene (HDPE), rigid polymers, polymer coated metals, composite materials, concrete, copper-nickel alloys, titanium alloys, austenitic nickel cast iron alloys, aluminum-bronze alloys, or nickel-aluminum bronze alloys. Each membrane element cluster 230 can comprise between 1 to 26 membrane elements 234. The membrane element cluster 230 can include 5 membrane elements 234, or 6 membrane elements 234, or 18 membrane elements 234, or at least 5 membrane elements 234, or at least 18 membrane elements 234, or between 1 and 5 membrane elements 234, or between 5 and 18 membrane elements 234, or between 18 and 36 membrane elements 234. The diameter of each membrane element 234 can be between 2 inches or less or 16 inches or more. The diameter of each membrane element 234 can be at least 2 inches, or at least 4 inches, or at least 8 inches, or at least 16 inches, or between 2 and 4 inches, or between 4 and 8 inches, or between 8 and 16 inches. The length of each membrane element 234 can be between 20 inches or less to 80 inches or more. The length of each membrane element 234 can be at least 20 inches, or at least 40 inches, or at least 80 inches, or between 20 and 40 inches, or between 40 and 80 inches. Each membrane element 234 comprises a plurality of membranes wrapped around a permeate collection unit 235. The plurality of membranes may comprise any suitable materials, such as polymers, composites, metals, or ceramics. The plurality of membranes may comprise polyvinylidene fluoride, polysulfone, polyacrylonitrile, polyacrylonitrile-polyvinyl chloride copolymers, poly ether sulfone, cellulose acetate-cellulose nitrate blends, nylons, polytetrafluoroethylene, cellulose acetate, polysulfone coated with aromatic polyamides, or stainless steel. The membrane elements 234 can include one or more spacers to separate adjacent membranes. Each membrane can be spaced apart from adjacent an adjacent membrane by a distance from 40 mils (1.02 mm) or less to 240 mils (6.10 mm) or more. Each membrane can be spaced apart from an adjacent membrane by a distance of at least 40 mils (1.02 mm), or at least 50 mils (1.27 mm), or at least 60 mils (1.52 mm), or at least 70 mils (1.78 mm), or at least 80 mils (2.03 mm), or at least 90 mils (2.29 mm), or at least 100 mils (2.54 mm), or at least 110 mils (2.79 mm), or at least 120 mils (3.05 mm), or at least 130 mils (3.30 mm), or at least 140 mils (3.56 mm), or at least 150 mils (3.81 mm), or at least 160 mils (4.06 mm), or at least 170 mils (4.32 mm), or at least 180 mils (4.57 mm), or at least 190 mils (4.83 mm), or at least 200 mils (5.08 mm), or at least 210 mils (5.33 mm), or at least 220 mils (5.59 mm), or at least 230 mils (5.84 mm), or at least 240 mils (6.10 mm), or between 40 mils (1.02 mm) and 50 mils (1.27 mm), or between 50 mils (1.27) and 60 mils (1.52 mm), or between 60 mils (1.52 mm) and 70 mils (1.78 mm), or between 70 mils (1.78 mm) and 80 mils (2.03 mm), or between 80 mils (2.03 mm) and 90 mils (2.29 mm), or between 90 mils (2.29 mm) and 100 mils (2.54 mm), or between 100 mils (2.54 mm) and 110 mils (2.79 mm), or between 110 mils (2.79 mm) and 120 mils (3.05 mm), or between 120 mils (3.05 mm) and 130 mils (3.30 mm), or between 130 mils (3.30 mm) and 140 mils (3.56 mm), or between 140 mils (3.56 mm) and 150 mils (3.81 mm), or between 150 mils (3.81 mm) and 160 mils (4.06 mm), or between 160 mils (4.06 mm) and 170 mils (4.32 mm), or between 170 mils (4.32 mm) and 180 mils (4.57 mm), or between 180 mils (4.57 mm) and 190 mils (4.83 mm), or between 190 mils (4.83 mm) and 200 mils (5.08 mm), or between 200 mils (5.08 mm) and 210 mils (5.33 mm), or between 210 mils (5.33 mm) and 220 mils (5.59 mm), or between 220 mils (5.59 mm) and 230 mils (5.84 mm), or between 230 mils (5.84 mm) and 240 mils (6.10 mm), or between 80 mils (2.03 mm) and 240 mils (6.10 mm), or between 80 mils (2.03 mm) and 160 mils (4.06 mm), or between 80 mils (2.03 mm) and 120 mils (3.05 mm), or between 120 mils (3.05 mm) and 160 mils (4.06 mm), or between 120 mils (3.05 mm) and 240 mils (6.10 mm), or between 160 mils (4.06 mm) and 240 mils (6.10 mm).

The permeate collection unit 235 may comprise a pipe or tube. Permeate flows from each permeate collection unit 235 to the permeate collection manifold 236, and then from the permeate collection manifold 236 to the central collection unit 238, equivalent to the permeate collection tube 270 shown in FIGS. 5A-C, through manifold connection 239. The manifold connection 239 can comprise a pipe or tube.

The central collection unit 238 may also comprise a pipe or tube. The permeate collection manifold 236 can comprise a plurality of ingresses to engage the element collection units 235 so as to receive permeate from the element collection units 235. There can be an ingress for each element collection unit 235, or each ingress may receive more than one element collection unit 235. In some embodiments, there is a single manifold connection 239 between the permeate collection manifold 236 and the central collection unit 238. Alternatively, there can be a plurality of manifold connections 239. In some embodiments, there may be at 5 manifold connections 239, or 6 manifold connections 239, or as many as 18 or more manifold connections 239. The permeate collection manifold 236 may comprise an egress for each manifold connection 239 to allow permeate to enter to manifold connection 239. The central collection unit 238 may comprise an ingress for each manifold connection 239 to allow permeate to flow out of the manifold connection 239 and into the central collection unit 238.

In some embodiments, a plurality of the permeate collection units 235, the permeate collection manifold 236, the manifold connection 239, and the central collection unit 238, can comprise 1 preformed piece. Alternatively, one or more of the permeate collection units 235, the permeate collection manifold 236, the manifold connection 239, and the central collection unit 238 can comprise separate components attached through any suitable fastening techniques, such as welding or screwing. The membrane elements 234 can be cylindrical in shape and arranged around the central collection unit 238. The permeate collection manifold 236 may be a circular pipe or tube engaged to the permeate collection unit 235 of each membrane element 234 and may form a concentric circle around the central collection unit 238. The permeate collection manifold 236, central collection unit 238, and the manifold connection 239 can comprise any suitable material. For example, any of the permeate collection manifold 236, central collection unit 238, and the manifold connection 239 can comprise coated carbon steel, stainless steel, plastic, polyvinyl chloride (PVC), high-density polyethylene (HDPE), rigid polymers, polymer coated metals, composite materials, concrete, copper-nickel alloys, titanium alloys, austenitic nickel cast iron alloys, aluminum-bronze alloys, or nickel-aluminum bronze alloys. The central collection unit 238 may be located in the center of the membrane elements 234 and the permeate collection manifold 236.

As described with reference to FIGS. 5A-C, the single shaft system can comprise a plurality of membrane element clusters 230. The central collection unit 238 of each membrane element cluster 230 can be configured to engage the central collection units 238 of membrane element clusters 230 above and below it. The central collection units 238 may be connected using any suitable fasteners. For example, the central collection units 238 may be connected through screws, bolts, rivets, hooks, anchors, nails, or staples. Alternatively, the central collection units 238 may be welded or may comprise threaded sections to engage adjacent central collection units 238. The central collection units 238 may be connected prior to installation into the shaft 220 or may be connected in place. The central collection unit 238 of the membrane element cluster 230 closest to ground level can engage the permeate collection tube 270. Thus, permeate flows through the central collection units 238 of each membrane element cluster 230 to the permeate collection tube 270. The submersible pump power cord 285 can also extend from the permeate collection tube 270 through the central collection units 238 of the membrane element clusters 230 and to the submersible pump 280.

The system can have a maximum permeate GPD of between 18,500 GPD or less to 1,152,000 GPD or more. The system can have a maximum permeate GPD of at least 37,000 GPD, or at least 192,000 GPD, or at least 576,000 GPD, or between 18,500 GPD and 37,000 GPD, or between 37,000 GPD and 192,000 GPD, or between 192,000 GPD and 576,000 GPD, or between 576,000 GPD and 1,152,000 GPD. The system may have a permeate recovery of between 2% or less and 16% or more. The system may have a permeate recovery of at least 5%, or at least 8%, or between 2% and 5%, or between 5% and 8%, or between 8% and 16%.

Figure 7:
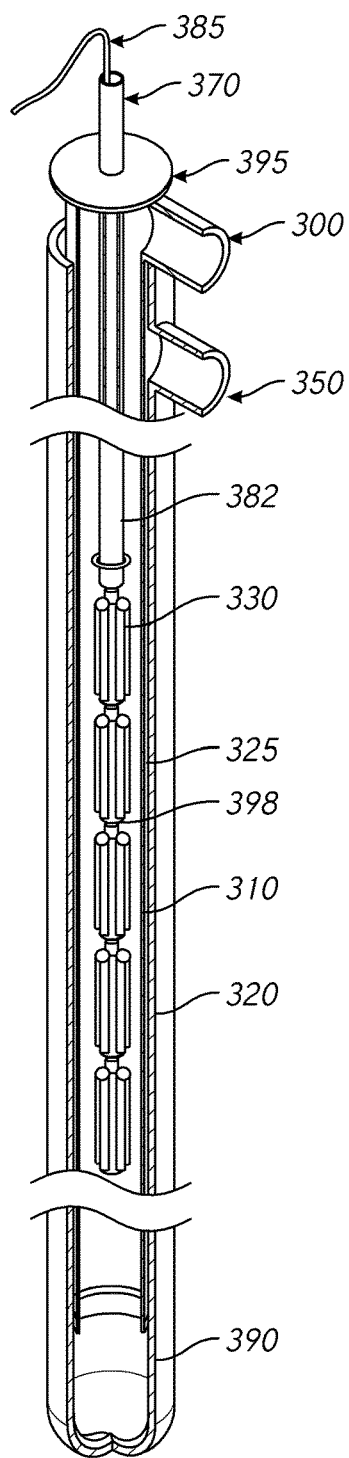
FIG. 7 provides a perspective cross-sectional diagram (not to scale) of a filtration system.

FIG. 7 shows a perspective cross-sectional view of another embodiment of the single shaft system. In this embodiment, the shaft 320 is flooded through an influent tunnel 300 from the body of water. The shaft 320 can comprise any suitable material. For example, the shaft 320 can comprise coated carbon steel, stainless steel, plastic, polyvinyl chloride (PVC), high-density polyethylene (HDPE), rigid polymers, polymer coated metals, composite materials, concrete, copper-nickel alloys, titanium alloys, austenitic nickel cast iron alloys, aluminum-bronze alloys, or nickel-aluminum bronze alloys. The internal diameter of the shaft 320 can range from as little as 8 or less inches to as much as 108 or more inches. The internal diameter of the shaft 320 can be at least 16 inches, or at least 32 inches, or at least 54 inches, or from 16 to 54 inches, or from 16 to 32 inches, or from 32 to 54 inches. In some embodiments, the shaft 320 can comprise a plurality of interlocking components. The shaft 320 may be pre-formed or may be formed in place. The components may be connected using any suitable fasteners. For example, the components may be connected through screws, bolts, rivets, hooks, anchors, nails, or staples. Alternatively, the components may be welded or may comprise threaded sections to engage adjacent components.

An inflow tube 310 within the shaft 320 contains the membrane elements 330 and separates the return flow of the concentrate out of the concentrate tunnel 350. The inflow tube 310 can comprise any suitable material. For example, the inflow tube 310 can comprise coated carbon steel, stainless steel, plastic, polyvinyl chloride (PVC), high-density polyethylene (HDPE), rigid polymers, polymer coated metals, composite materials, concrete, copper-nickel alloys, titanium alloys, austenitic nickel cast iron alloys, aluminum-bronze alloys, or nickel-aluminum bronze alloys. The inflow tube 310 can have an internal diameter ranging from as little as 6 or less inches to as much as 88 or more inches. The internal diameter of the inflow tube 310 can be at least 12 inches, or at least 26 inches, or at least 26 inches, or at least 44 inches. The inflow tube 310 can contain as many as 80 or more membrane elements 330 or as few as 1 membrane element 330. The inflow tube 310 can contain at 10 or less membrane elements 330, or at least 10 membrane elements 330, or at least 20 membrane elements 330, or at least 30 membrane elements 330, or at least 40 membrane elements 330, or between 10 to 30 membrane elements 330, or between 30 and 50 membrane elements 330. The membrane elements 330 can be positioned at a depth of at least 500 feet, or at least 1,000 feet, or at least 1,100 feet, or at least 1,200 feet, or at least 1,500 feet, or at least 1,800 feet, or at least 2,100 feet, or at least 2,400 feet, or between 500 and 1,000 feet, or between 1,000 and 1,100 feet, or between 1,100 and 1,200 feet, or between 1,200 and 1,500 feet, or between 1,500 and 1,800 feet, or between 1,800 and 2,100 feet, or between 2,100 and 2,400 feet.

The single shaft system further includes vertical guides 325. The shaft 320 can house between 1 and 100 or more vertical guides 325. The shaft 320 can house at least 10 vertical guides 325, or at least 20 vertical guides 325, or at least 30 vertical guides 325, or at least 40 vertical guides 325, or at least 50 vertical guides 325, or at least 60 vertical guides 325, or at least 70 vertical guides 325, or at least 80 vertical guides 325, or at least 90 vertical guides 325, or at least 100 vertical guides 325, or between 1 and 20 vertical guides 325, or between 20 and 40 vertical guides 325, or between 40 and 60 vertical guides 325, or between 60 and 80 vertical guides 325, or between 80 and 100 vertical guides 325. The vertical guides 325 can comprise any suitable material. For example, the vertical guides 325 can comprise coated carbon steel, stainless steel, plastic, polyvinyl chloride (PVC), high-density polyethylene (HDPE), rigid polymers, polymer coated metals, composite materials, concrete, copper-nickel alloys, titanium alloys, austenitic nickel cast iron alloys, aluminum-bronze alloys, or nickel-aluminum bronze alloys. The vertical guides 325 can be solid. Alternatively, the vertical guides 325 can be hollow. In some embodiments, the vertical guides 325 can comprise both solid and hollow sections. The vertical guides 325 may be continuous along the length of the shaft 320. Alternatively, the vertical guides 325 may comprise a plurality of segments along the length of the shaft 320. The plurality of segments may be configured to engage each other. The plurality of segments may be configured to interlock. The plurality of segments may be configured to connect using any suitable fastener. For example, the plurality of fasteners may be configured to connect using screws, bolts, rivets, hooks, anchors, nails, or staples. Alternatively, the plurality of segments can be welded or can comprise threaded sections to engage adjacent segments. Alternatively, the plurality of segments of the vertical guides 325 may be spaced apart. The spacing between the plurality of segments can range from 1 inch or less to 2 feet or more. The spacing between the plurality of segments can be at least 2 inches, or at least 4 inches, or at least 6 inches, or at least 8 inches, or at least 12 inches, or at least 18 inches, or at least 2 feet, or between 2 and 8 inches, or between 8 and 12 inches, or between 12 and 18 inches, or between 18 and 24 inches. The vertical guides 325 may be located between the shaft 320 and the inflow tube 310 or on the interior surface of the inflow tube 310. The total length of the shaft 320 spanned by the vertical guides 325 can be between 1 or fewer feet and 40 or more feet. The total length of the shaft 320 spanned by the vertical guides 325 can be at least 10 feet, or at least 20 feet, or at least 30 feet, or between 10 and 30 feet, or between 10 and 20 feet, or between 20 and 30 feet. The vertical guides 325 may have any suitable cross-section. For example, the cross section can be circular, triangular, quadrilateral, or polygonal.

The permeate is pumped to the surface through the permeate collection tube 370 by the submersible pump 380 (depicted in FIG. 8) in the pump well 382. The permeate collection tube 370 can comprise any suitable material. For example, the permeate collection tube 370 can comprise can comprise coated carbon steel, stainless steel, titanium, plastic, polyvinyl chloride (PVC), high-density polyethylene (HDPE), rigid polymers, polymer coated metals, composite materials, concrete, copper-nickel alloys, titanium alloys, austenitic nickel cast iron alloys, aluminum-bronze alloys, or nickel-aluminum bronze alloys. The permeate collection tube 370 can have an internal diameter of between 2 inches or less and 24 inches or more. The permeate collection tube 370 can have an internal diameter of at least 4 inches, or at least 8 inches, or at least 12 inches, or at least 16 inches, or at least 24 inches, or between 2 and 4 inches, or between 4 and 8 inches, or between 8 and 12 inches, or between 12 and 16 inches, or between 16 and 24 inches. The permeate collection tube 370 have a rating from 300 psi or less to 1600 psi or more. The permeate collection tube 370 can have a rating of at least 300 psi, or at least 400 psi, or at least 500 psi, or at least 600 psi, or at least 700 psi, or at least 800 psi, or at least 900 psi, or at least 1,000 psi, or at least 1,100 psi, or at least 1,200 psi, or at least 1,300 psi, or at least 1,400 psi, or at least 1,500 psi, or at least 1,600 psi, or between 300 and 600 psi, or between 600 and 900 psi, or between 900 and 1,200 psi, or between 1,200 and 1,600 psi.

The pump well 382 can be located above the membrane elements 330. Alternatively, the submersible pump 380 can be located above the membrane elements 330, or between several membrane elements 330, or to the side of the membrane elements 330, or exterior to the outer surface of the shaft 320.

The submersible pump 380 receives power from the submersible pump power cord 385. The submersible pump power cord 385 extends from the surface level to the submersible pump 380. The submersible pump power cord 385 may extend through the permeate collection tube 370 to the submersible pump 380. Alternatively, the submersible pump power cord 385 can extend between the inflow tube 310 and the membrane elements 330, or through one or more sections of the membrane elements 330, or between the inflow tube 310 and the interior surface of the shaft 320, or along the exterior of the shaft 320. The submersible pump power cord 385 may be attached to one or more surfaces of the system. The submersible pump power cord 385 can be attached through banding or clamping. The submersible pump power cord 385 may have either a flat or round configuration and may contain insulation materials, such as polypropylene or ethylene diene monomer synthetic rubber, and metal armor materials, such as galvanized steel.

In an illustrative embodiment, the single shaft system can be integrated into a well having a depth between 600 feet or less to 2,400 feet or more. The well depth can be at least 600 feet, or at least 1,200 feet, or at least 1,400 feet, or at least 2,400 meters, or between 600 and 1,200 feet, or between 1,200 and 1,400 feet, or between 1,400 meters and 2,400 feet. The shaft 320 may be oriented so that the length of the shaft runs perpendicular to the surface. Alternatively, the shaft 320 can be oriented at least 15°, or at least 30°, or at least 45°, or at least 60°, or at least 75°, or at least 90°, or less than 90°, or between 0° and 15°, or between 15° and 30°, or between 30° and 45°, or between 45° and 60°, or between 60° and 75°, or between 75° and 90° from an axis running perpendicular to the surface. The influent tunnel 300 and concentrate tunnel 350 can be oriented perpendicular to the shaft 320. Alternatively, one or more of the influent tunnel 300 and the concentrate tunnel 350 can be angled at least 15°, or at least 30°, or at least 45°, or at least 60°, or at least 75°, or at least 90°, or less than 90°, or between 0° and 15°, or between 15° and 30°, or between 30° and 45°, or between 45° and 60°, or between 60° and 75°, or between 75° and 90° from the surface of the shaft 320. The influent tunnel 300 can be constructed at an angle to the concentrate tunnel 350 so the concentrate will not influence the feed water.

The influent tunnel 300 can be constructed at an angle to the concentrate tunnel 350 of at least 15°, or at least 30°, or at least 45°, or at least 60°, or at least 75°, or at least 90°, or less than 90°, or at least 105°, or at least 120°, or at least 135°, or at least 150°, or at least 165°, or at least 180°, or between 0° and 15°, or between 15° and 30°, or between 30° and 45°, or between 45° and 60°, or between 60° and 75°, or between 75° and 90°, or between 90° and 105°, or between 105° and 120°, or between 120° and 135°, or between 135° and 150°, or between 150° and 165°, or between 165° and 180°, or between 90° and 180°. The two tunnels can be constructed with ambient currents in mind so the concentrate is driven away from the influent tunnel 300. So if the ambient current runs north to south the concentrate tunnel can be the southernmost. The vertical distance between the center of influent tunnel 300 and the concentrate tunnel 350 can be between 5 feet or less to 20 feet or more. The vertical distance between the center of influent tunnel 300 and the concentrate tunnel 350 can be at least 5 feet, or at least 10 feet, or at least 20 feet, or between 5 and 10 feet, or between 10 and 20 feet. The height differential between the influent tunnel 300 and the concentrate tunnel 350 can be at least partially responsible for the circulation of feed water or removal of concentrate from the system. Feed water may be introduced into the influent tunnel 300 through a natural water source such as tide or river flow. Alternatively, feed water may be introduced to the influent tunnel 300 through the action of a pump, such as a low-head high-capacity pump. The pump may be positioned exterior to the influent tunnel 300. Alternatively, the pump may be positioned in the influent tunnel 300, in the inflow tube 310, or in any other suitable location in the system. The influent tunnel 300 can be positioned from between 5 feet or less and 20 feet or more above ground level. The influent tunnel 300 can be at least 5 feet above ground level, or at least 10 feet above ground level, or at least 20 feet above ground level, or at between 5 and 10 feet above ground level, or between 10 and 20 feet above ground level.

The single shaft system may also include a debris collection recess 390 at the bottom of the shaft 320. The debris collection recess 390 can have a depth of between 25 feet or less to 100 feet or more. The debris collection recess 390 can have a depth of at least 25 feet, or at least 50 feet, or at least 100 feet, or between 25 and 50 feet, or between 50 and 100 feet. The single shaft system may further include a flange connection 395 above the inflow tube 310. The flange connection 395 may be configured to cover the opening of the inflow tube 310 to prevent debris from entering but still allow the inflow tube 310 to be open to the atmosphere. The single shaft system may further comprise one or more couplers 398 to connect adjacent elements of the system. The couplers 398 may include threads configured to engage several adjacent elements.

In some embodiments, feed water may undergo pretreatment prior to entering the influent tunnel 300. Pretreatment can include sand filtration, candle filtration, ultrafiltration, microfiltration, coagulation and flocculation.

Figure 8:
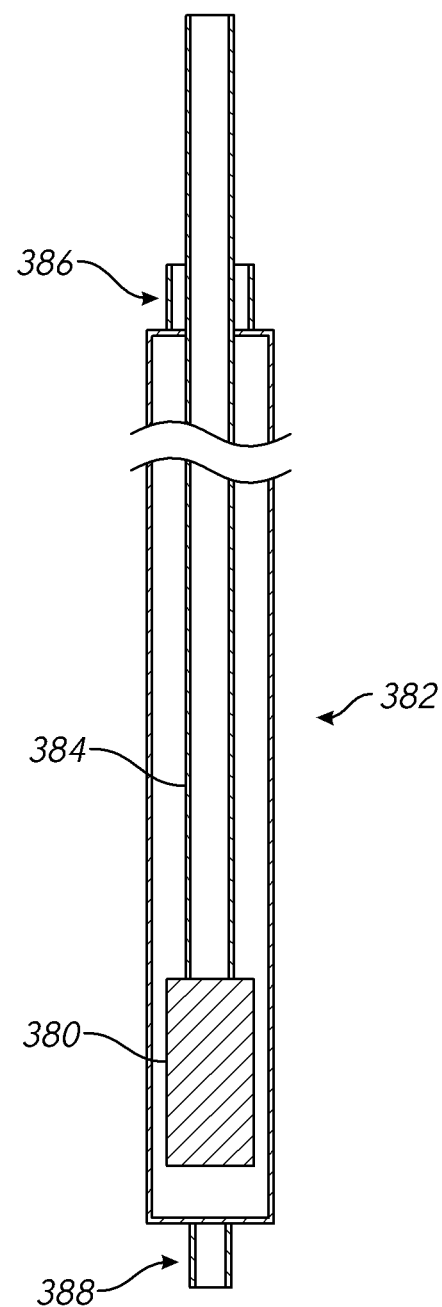
FIG. 8 provides a cross-sectional diagram (not to scale) of a pump well.

FIG. 8 shows a cross section view of the pump well 382. The pump well 382 may have a length between 10 feet or less to 40 feet or more. The pump well 382 may have a length of at least 10 feet, or at least 20 feet, or at least 40 feet, or between 10 and 20 feet, or between 20 and 40 feet. The pump well 382 may have an internal diameter between 4 or less inches and 16 or more inches. The pump well 382 may have an internal diameter of at least 4 inches, or at least 8 inches, or at least 16 inches, or between 4 and 8 inches, or between 8 and 16 inches. The pump well 382 can comprise any suitable material. For example, the pump well 382 may comprise coated carbon steel, stainless steel, plastic, polyvinyl chloride (PVC), high-density polyethylene (HDPE), rigid polymers, polymer coated metals, composite materials, concrete, copper-nickel alloys, titanium alloys, austenitic nickel cast iron alloys, aluminum-bronze alloys, or nickel-aluminum bronze alloys.

The pump well 382 houses the submersible pump 380. In some embodiments, the submersible pump 380 can comprise a plurality of pumps that can be located in one or more locations within the pump well 382. The submersible pump 380 can comprise a single stage or a multi-stage submersible pump. The submersible pump 380 can comprise a bladder pump, or a grinder pump, or a well pump, or a borehole pump, or a fountain pump, or a utility pump. The submersible pump 380 can have an outer diameter between 3 or fewer inches to 11 or more inches. The submersible pump 380 can have an outer diameter of at least 3 inches, or at least 5.75 inches, at least 11 inches, or between 3 and 5.75 inches, or between 5.75 and 11 inches. The submersible pump 380 may provide exposure to atmospheric pressure, allowing for a differential between the pressure characteristic of the submerged shaft or tunnel depth and the pressure characteristic of atmospheric pressure at the surface of the body of water. The pressure differential may be at least partially responsible for driving the filtration process.

The pump well 382 may further comprise a pipe 384 extending from the submersible pump 380 out of the top of the pump well 382. The pipe 384 may comprise any suitable material. For example, the pipe 384 may comprise coated carbon steel, stainless steel, plastic, polyvinyl chloride (PVC), high-density polyethylene (HDPE), rigid polymers, polymer coated metals, composite materials, concrete, copper-nickel alloys, titanium alloys, austenitic nickel cast iron alloys, aluminum-bronze alloys, or nickel-aluminum bronze alloys. The pipe 384 may have an outer diameter of between 1.5 inches or less and 6 inches or more. The pipe 384 may have an outer diameter of at least 1.5 inches, or at least 3 inches, or at least 6 inches, or between 1.5 and 3 inches, or between 3 and 6 inches. The pipe 384 connects to the permeate collection tube 370 to deliver permeate to the surface.

The pump well 382 may further include an interlocking section 386 configured to interlock with an adjacent element to the pump well 382. The interlocking section 386 may comprise a threaded member capable of engaging a threaded section of an adjacent element. In one embodiment, the interlocking section 386 may engage the permeate collection tube 370. Alternatively, the interlocking section 386 may engage a membrane element 330. Alternatively, the interlocking section 386 may engage a coupler 398. The interlocking section 386 may have an outer diameter of between 3 inches or less to 12 inches or less. The interlocking section 386 may have an outer diameter of at least 3 inches, or at least 6 inches, or at least 12 inches, or between 3 and 6 inches, or between 6 and 12 inches. The pump well 382 may further comprise an interlocking section 388 configured to interlock with an adjacent element to the pump well 382. The interlocking section 388 may comprise a threaded member capable of engaging a threaded section of an adjacent element. In one embodiment, the interlocking section 388 may be configured to engage a membrane element 330. The interlocking section 388 can also be configured to engage a coupler 398. The interlocking section 388 may have an outer diameter of between 1.5 inches or less and 6 inches or more. The interlocking section 388 may have an outer diameter of at least 1.5 inches, or at least 3 inches, or at least 6 inches, or between 1.5 and 3 inches, or between 3 and 6 inches.

Figure 9:
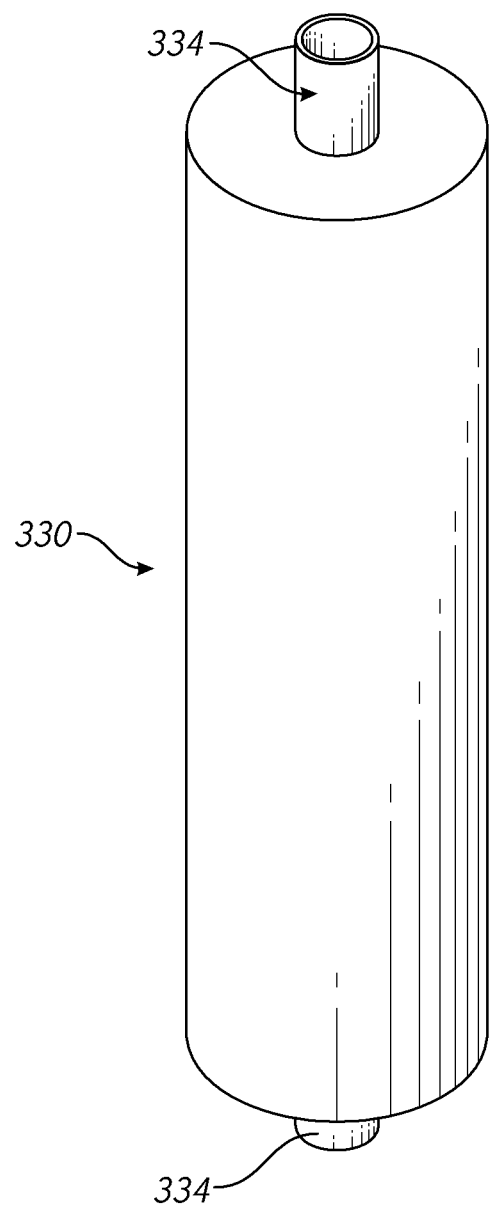
FIG. 9 provides a perspective diagram (not to scale) of a membrane element.

FIG. 9 shows a perspective view of a membrane element 330. The membrane element 330 may have a length of between 20 feet or less to 80 feet or more. The membrane element 330 may have a length of at least 20 feet, or at least 40 feet, or at least 80 feet, or between 20 and 40 feet, or between 40 and 80 feet. The membrane element 330 may have an outer diameter of between 5.5 or less inches to 22 or more inches. The membrane element 330 may have an outer diameter of at least 5.5 inches, or at least 11 inches, or at least 22 inches, or between 5.5 and 11 inches, or between 11 and 22 inches.

Each membrane element 330 comprises a plurality of membranes wrapped around a central collection unit (not shown), such as the permeate collection tube 370 shown in FIG. 7. The plurality of membranes may comprise any suitable materials, such as polymers, composites, metals, or ceramics. The plurality of membranes may comprise polyvinylidene fluoride, polysulfone, polyacrylonitrile, polyacrylonitrile-polyvinyl chloride copolymers, poly ether sulfone, cellulose acetate-cellulose nitrate blends, nylons, polytetrafluoroethylene, cellulose acetate, polysulfone coated with aromatic polyamides, or stainless steel. The membrane elements 330 can include one or more spacers to separate adjacent membranes. Each membrane can be spaced apart from adjacent an adjacent membrane by a distance from 40 mils or less to 240 mils or more. Each membrane can be spaced apart from an adjacent membrane by a distance of at least 40 mils, or at least 50 mils, or at least 60 mils (1.52 mm), or at least 70 mils (1.78 mm), or at least 80 mils (2.03 mm), or at least 90 mils (2.29 mm), or at least 100 mils (2.54 mm), or at least 110 mils (2.79 mm), or at least 120 mils (3.05 mm), or at least 130 mils (3.30 mm), or at least 140 mils (3.56 mm), or at least 150 mils (3.81 mm), or at least 160 mils (4.06 mm), or at least 170 mils (4.32 mm), or at least 180 mils (4.57 mm), or at least 190 mils (4.83 mm), or at least 200 mils (5.08 mm), or at least 210 mils (5.33 mm), or at least 220 mils (5.59 mm), or at least 230 mils (5.84 mm), or at least 240 mils, or between 40 mils and 50 mils, or between 50 and 60 mils (1.52 mm), or between 60 mils and 70 mils (1.78 mm), or between 70 mils (1.78 mm) and 80 mils (2.03 mm), or between 80 mils (2.03 mm) and 90 mils (2.29 mm), or between 90 mils (2.29 mm) and 100 mils (2.54 mm), or between 100 mils (2.54 mm) and 110 mils (2.79 mm), or between 110 mils (2.79 mm) and 120 mils (3.05 mm), or between 120 mils (3.05 mm) and 130 mils (3.30 mm), or between 130 mils (3.30 mm) and 140 mils (3.56 mm), or between 140 mils (3.56 mm) and 150 mils (3.81 mm), or between 150 mils (3.81 mm) and 160 mils (4.06 mm), or between 160 mils (4.06 mm) and 170 mils (4.32 mm), or between 170 mils (4.32 mm) and 180 mils (4.57 mm), or between 180 mils (4.57 mm) and 190 mils (4.83 mm), or between 190 mils (4.83 mm) and 200 mils (5.08 mm), or between 200 mils (5.08 mm) and 210 mils (5.33 mm), or between 210 mils (5.33 mm) and 220 mils (5.59 mm), or between 220 mils (5.59 mm) and 230 mils (5.84 mm), or between 230 mils (5.84 mm) and 240 mils, or between 80 mils (2.03 mm) and 240 mils, or between 80 mils (2.03 mm) and 160 mils (4.06 mm), or between 80 mils (2.03 mm) and 120 mils (3.05 mm), or between 120 mils (3.05 mm) and 160 mils (4.06 mm), or between 120 mils (3.05 mm) and 240 mils, or between 160 mils (4.06 mm) and 240 mils, The membrane element 330 further includes one or more interlocking connections 334. There may be an interlocking connection 334 on either or both the bottom and top of the membrane element 330. The interlocking connection 334 may comprise a threaded member capable of engaging a threaded section of an adjacent element. In one embodiment, the interlocking connection 334 may engage the permeate collection tube 370. Alternatively, the interlocking connection 334 may engage an interlocking connection 334 of another membrane element 330. The interlocking connection 334 may also engage a coupler 398. Alternatively, the interlocking connection 334 can engage the interlocking section 386 or the interlocking section 388 of the pump well 382. Thus, permeate may flow from the central collection unit of a membrane element 330 through the interlocking connection 334 in to more membrane elements 330, or in to the pump well 382, or in to the permeate collection tube 370. The interlocking connection 334 may comprise a pipe or tube. The interlocking connection 334 may have an outer diameter of between 1.5 inches or less and 6 inches or more. The interlocking connection 334 may have an outer diameter of at least 1.5 inches, or at least 3 inches, or at least 6 inches, or between 1.5 and 3 inches, or between 3 and 6 inches. The interlocking connection 334 may have a length of between 2 inches or less to 8 inches or more. The interlocking connection 334 may have a length of at least 2 inches, or at least 4 inches, or at least 8 inches, or between 2 inches and 4 inches, or between 4 inches and 8 inches. The interlocking connection 334 may comprise any suitable material. For example, the interlocking connection 334 can comprise may comprise coated carbon steel, stainless steel, plastic, polyvinyl chloride (PVC), high-density polyethylene (HDPE), rigid polymers, polymer coated metals, composite materials, concrete, copper-nickel alloys, titanium alloys, austenitic nickel cast iron alloys, aluminum-bronze alloys, or nickel-aluminum bronze alloys.

Advantages of the membrane element 300 which illustrates wrapping the plurality of membranes around the permeate collection tube 370 itself, include saving space within the inflow tube 310 and shaft 320. Furthermore, wrapping a plurality of membranes around the permeate collection tube 370 reduces or eliminates leak opportunities and provides a more efficient system.

The system can have a maximum permeate GPD of between 18,500 GPD or less to 1,152,000 GPD or more. The system can have a maximum permeate GPD of at least 37,000 GPD, or at least 192,000 GPD, or at least 576,000 GPD, or between 18,500 GPD and 37,000 GPD, or between 37,000 GPD and 192,000 GPD, or between 192,000 GPD and 576,000 GPD, or between 576,000 GPD and 1,152,000 GPD. The system may have a permeate recovery of between 2% or less and 16% or more. The system may have a permeate recovery of at least 5%, or at least 8%, or between 2% and 5%, or between 5% and 8%, or between 8% and 16%.

Depth of Membrane Modules

One parameter used to determine the required pressure (depth) for the system is the osmotic pressure of the source water. Osmosis is defined as the net movement of a solvent molecule (e.g. water) through a semi-permeable membrane from the side of lower concentration to the side of higher concentration to balance the concentrations. The osmotic pressure is the amount of pressure applied to the high concentration side of the semi-permeable membrane to prevent osmosis from occurring. In other words, the osmotic pressure creates a steady-state for two solutions where no movement occurs across the membrane. If the applied pressure is less than the osmotic pressure, natural osmosis occurs. If the applied pressure is greater than the osmotic pressure, then the flow of the solution from the high concentration to the low concentration occurs. This is reverse osmosis.

The theoretical calculation for the osmotic pressure of a solution is based on the summation of the molarity of the different molecules and the temperature of the solution. The molarity is defined as the number of molecules in the solution divided by the volume of the solution. In general, the osmotic pressure can be approximated by dividing the Total Dissolved Solids (TDS) in mg/l by 100 (e.g. 35,000 mg/l TDS=350 psi (24 bar)).

The actual required osmotic pressure is the differential between osmotic pressure of the brine and the osmotic pressure of the permeate water.

The other pressure component that determines the preferred depth in addition to the osmotic pressure is the transmembrane pressure (TMP). The TMP can be thought of as the 'friction loss' across the membrane added to the driving pressure needed to produce the required flow. Just like any 'conduit,' there is a certain amount of energy required to move the water through the membrane at a certain flow rate. In order to get a particular flow through the membrane, the pressure must be greater than the combination of the osmotic pressure and the TMP at that flow. For SWRO membranes the TMP can be as high as 120 to 150 psi (8.3 to 10.3 bar) for the normal high flux operations. However, in the low flux system applications, it is approximately 20 to 40 psi (1.4 to 2.8 bar). For NF membranes it is even lower at approximately 10 to 20 psi (0.7 to 1.4 bar).

The resulting total driving pressure for seawater desalination applications of the system is approximately 370 to 400 psi (850 to 950 feet of depth or 255 to 285 m) based on a typical Pacific Ocean salinity. This will put the membrane cartridges at a comparable depth in the well bore.

Fresh surface water is generally low in dissolved solids (usually less than 1,000 mg/l), thus does not require significant osmotic pressure (about 10 psi). Using a mid-range (50% removal) NF membrane, the required driving pressure is on the order of 25 psi (55 feet or 16.8 m) for a medium range flux. However, well bore depths required for the myriad of different applications can span a broad range depending on source water constituents, desired treatment and flux requirements.

Many fresh water bodies, especially in mountain regions, are exceptionally clean and require filtering out larger biological contaminants only. In this case, a 'loose' nanofiltration system can be submerged into approximately 20 to 30 feet (9.1 m) of water in the well bore. If a water source is high in calcium carbonate, such as the lower Colorado River in the United States, a well bore depth in a reservoir of approximately 75 to 100 feet (22.9 to 30.5 m) can remove most of the calcium. However, as calcium carbonate is relatively harmless (though not to fixtures or water heaters) the system can merely treat the water for larger molecular contaminants at a far lesser well bore depth.

In the seawater applications, the membrane modules of preferred embodiments are preferably submerged in shafts or tunnels to depths sufficient to produce desired permeate water by ambient pressure of the seawater against the membrane without application of additional pressure. The type of membrane used and the depth to which the membrane modules are submerged will be dependent on the composition of the source water and the desired composition of the permeate. Such shaft depths are typically of at least about 228 meters, preferably at least about 305 meters. However, depending on the application, the systems of preferred embodiments can be deployed at other shaft depths. The 305 meters depth is preferred for seawater reverse osmosis to produce potable water from seawater of average salinity (e.g., about 35,000 mg/L). If a level of brackishness is permissible (e.g., for water used for irrigation or industrial processes), a shallower depth can be employed. For example, production of brackish water suitable for irrigating agriculture can be achieved with certain membranes submerged to a depth of from about 118 meters to about 291 meters. An acceptable level of brackishness can be selected by selecting the type (e.g., chemistry) of membrane and the depth of the membrane module depending upon the salinity of the ambient seawater. Systems of preferred embodiments utilizing nanofiltration membranes, for example, can be deployed in seawater at about 51 meters of depth to screen out about 20% of the salinity of the feed water, and also to remove calcium and many other unwanted constituents. Such systems can be employed as pre-treatment systems for surface desalination plants, expanding the capacity of existing plants and reducing maintenance as well as overall energy requirements by about 50% as compared to standard reverse osmosis plants. Systems of preferred embodiments utilizing ultrafiltration (UF) and/or microfiltration (MF) membranes can also be employed in connection with conventional desalination plants or industrial applications that are not proximate to oceans or other bodies of water of greater depths. Systems of preferred embodiments can be configured for use with industrial applications where the presence of calcium or other undesirable constituents present problems (e.g., corrosion or scale buildup), such as power plant cooling applications. Suitable RO and NF membranes for use with preferred embodiments are available commercially from Dow Water Solutions, Midland, Mich., and from Wongjin Chemical, South Korea.

In certain embodiments, systems can be configured for deployment at shallower shaft depths. For example, embodiments can be deployed in shallow shafts (for example, at a depth of about 7 meters) and used as ocean water intake systems, for example to produce cooling water for an onshore power plant. Such systems can also employ filter fabrics or screens in place of less porous membranes.

In addition, systems of preferred embodiments employing microfiltration, ultrafiltration, or nanofiltration membranes can be positioned in shafts/tunnels at depths as shallow as 6 meters and can be configured to filter out bacteria, viruses, organic matter, and inorganic compounds from the source water. For example, systems employing nanofiltration membranes can be positioned at a shaft depth of about 6 to 30 meters or at any other appropriate depth, depending upon the total dissolved solids to be removed and the desired quality of the product water. In freshwater sources with very low levels of dissolved solids, the osmotic pressure of the source water is a less significant factor in the filtration process (generally, every 100 mg/L total dissolved solids in the source water requires 1 pound per square inch (approximately 6.9 kPa) of pressure). Consequently, the transmembrane pressure losses of the membranes become more dominant in determining the required shaft depth for the desired level of treatment.

The primary advantage of the system is in energy savings as well as capital cost savings. In previous water treatment systems, the permeate must be pumped up from the depth of the shaft seeming to eliminate the advantage of the natural hydrostatic head in the shaft. In a traditional membrane plant the feed water is pressurized entirely, while in the system only the product water (permeate) is pumped up to pressure (to the surface). This provides several ecological advantages, including lower carbon footprint and reduced impact on sea life. Additionally a low recovery keeps the feed water salinity down near the ambient water body salinity. With the low recovery/salinity the osmotic pressure is kept at a fraction of a normal membrane plant thus reducing energy requirements further. The open configuration of the membrane element, to allow small suspended solids to pass through the element, has the added benefit of reducing the resistance through the element to allow a low energy process of getting a high amount of feed water through in the low recovery operation.

Different seawaters possess different salinities (e.g., the salinity of the Red Sea (40,000 ppm) is higher than the North Atlantic (37,900 ppm), which in turn is higher than the Black Sea (20,000 ppm)). The salt content of the open oceans, free from land influences, is rarely less than 33,000 ppm and seldom more than 38,000 ppm. The methods of preferred embodiments can be adjusted or modified to accommodate seawater of different salinities. For example, the preferred depth for submerging the system systems of preferred embodiments is deeper in shafts or tunnels being flooded by more saline water (e.g., Red Sea), and is shallower in less saline water (e.g., Black Sea). The depths referred to herein are those preferred for water of average salinity (33,000 to 38,000 ppm, preferably about 35,000 ppm), and can be adjusted to accommodate higher or lower salinity water.

Pumping Energy

The systems of preferred embodiments efficiently use hydrostatic pressure at depth instead of pumps to power the reverse osmosis filtration process, and thus do not require the vast amounts of energy needed in conventional land-based desalination systems. The systems of preferred embodiments employ pumping systems to pump the product water generated to the surface but such energy requirements are substantially lower than those required to desalinate water in land-based systems. Given the head pressure at depth in the shaft, far more energy is typically needed to pump water to the surface than to pump feed water by the membranes, even at very low recovery. For systems of preferred embodiments employing conventional reverse osmosis polyamide membranes, an operating depth of 1,000 feet is employed to produce potable water from average salinity seawater. For other membrane chemistries or when purifying water of different salinities (freshwater, brackish water, extremely saline water), lower depths or higher depths may be required to obtain water of the same reduced salt content.

As discussed above, the systems of preferred embodiments offer substantial energy savings over conventional land-based seawater desalination systems. For example, the energy to bring freshwater from 1,000 feet below the surface is calculated as follows:

$$HP = \frac{HF}{pE}$$

wherein HP=Horsepower; H=Total dynamic head in feet; F=Water flow in gallons per minute; p=Pumping constant=3,960 (for head in feet and flow in gpm); and E=Pump efficiency (assumed at 85% which is typical for large pumps).

To pump five million gallons of potable water per day (or 3,472 gpm) (about 18.9 million liters, or 13,144 liters per minute) to the surface, the horsepower is calculated as follows:

$$HP = \frac{1,000 \text{ feet} \times 3,472 \text{ gpm}}{3,960 \times 0.85} = 1,031.5$$

As the desalination industry typically compares system efficiencies using the units of kilowatt-hours per thousand gallons (or kWh per cubic meter), the horsepower is converted to kilowatts using the conversion factor 0.745 kilowatts per horsepower:

1,031.5 horsepower×0.745=768.5 kilowatts

Thus, 768.5 kilowatts will power a pump with the capacity of 3,472 gallons per minute (5 million gallons per day, 18.9 million liters per day, or 13,144 liters per minute). The energy consumed over that period is 18,443 kilowatt-hours. The ratio of the energy requirement to the water pumped yields a value of 3.69 kilowatt-hours per thousand gallons.

Further energy is required to move the feedwater/concentrate past the membrane elements. This will be a function of the recovery and the thickness of the feed spacer in the membrane elements. This energy can range from as low as 0.6 kWh/thousand gallons to 1.1 kWh/thousand gallons of product water.

TABLE 1

| Energy Use | Kilowatt-hours per Thousand Gallons |
| --- | --- |
| Pump energy to surface | 3.69 |
| Pump energy for feed water (5% recovery) | 0.70 |
| Ancillary energy (5% of pump energy) | 0.22 |
| Total energy use | 4.61 |

This energy requirement of just 4.65 kilowatt-hours per thousand gallons (about 1.23 kWh per cubic meter) is substantially lower than that of state-of-the-art reverse osmosis systems, which typically consume over sixteen kilowatt-hours per thousand gallons (over 4 kWh per cubic meter). For example, the Tuas desalination plant was completed in Singapore in 2005 and its contractor touts it as "one of the most efficient in the world" needing only 16.2 kilowatt-hours per thousand gallons (about 4.3 kWh per cubic meter). Even conventional water sources often require far more energy than the system for coastal populations. Table 2 provides data demonstrating the superior energy efficiency of the systems of preferred embodiments compared to those of the Tuas desalination plant and two major water resources for a well-known arid coastal region.

TABLE 2

| Water Resource | Kilowatt-hours per Thousand Gallons (kWh per Cubic Meter) |
| --- | --- |
| California State Water Project | 9.2 to 13.2 (2.4 to 3.5) |
| Colorado River Aqueduct | 6.1 (1.6) |
| Tuas Desalination Plant | 16.2 (4.3) |
| Depth Exposed Membrane for Water Extraction Sea-Well System | 4.65 (1.23) |

The result of the system's design is a low energy process that harnesses natural forces efficiently. For the system, the power reduction is approximately 65% versus current state-of-the-art traditional SWRO systems. In general terms, this reduction can be summarized as half the flow at half the pressure. A typical large scale SWRO plant with energy recovery uses approximately 16 kilowatt-hours per thousand gallons of product water (or about 4.2 kWh/m$_3$). A SWRO plant that operates at 50% recovery must pre-treat and pressurize 2 gallons of feed water to yield 1 gallon of product water. At a target of about 7 percent recovery, the system only needs to pump the 1 gallon of product water (besides the 16 gallons of very low-pressure inflow) or about half the flow as compared to a traditional SWRO plant.

To achieve the 50% recovery, a traditional SWRO system must reach a pressure of nearly 800 to 1,000 psi (55 to 69 bar). As osmotic pressure for typical Pacific Ocean seawater is approximately 320 to 350 psi (22 to 24 bar), the required pressure is more than twice osmotic. Since the system is designed to operate at extremely low recovery; the required pressure is only slightly higher than osmotic at about 350 to 400 psi (24 to 28 bar) or about half the pressure of a traditional onshore SWRO plant. This required pressure is supplied by the differential between the water column in the well bore of source water and that in the permeate collection tube.

Advantages of Depth Exposed Membrane for Water Extraction System

The system offers numerous cost advantages over conventional water resources and more specifically over conventional water treatment and desalination technologies. For example, conventional reverse osmosis systems require relatively high operating pressures (on the order of 800 psi (5,516 kPa)) to produce potable water. The system does not require much, if any, energy to pressurize feed water. As natural pressure at depth in a constructed shaft is used in the system, there is no need for pumps to create it artificially.

In addition to cost advantages, the systems of preferred embodiments have significant environmental and production advantages. Environmental advantages include dramatically decreased brine concentration. A conventional desalination plant takes in seawater and returns about half of it back (in many cases to locations near to the shore) in the form of brine with twice the salinity. Such higher salinity brine can have a detrimental impact on the sea life in the area of the disposal. Through dispersion and mixing, the brine eventually dilutes with the seawater, but because of the continuous desalination process, there is always an area around the discharge pipe of a conventional desalination system where sea life is impacted. The systems of preferred embodiments typically recover only 5% of the water leaving the concentrate very near ambient salinity. Additional ecological advantages include lack of sea life entrainment and impingement and decreased carbon footprint. Furthermore, unlike traditional spiral wound reverse osmosis membrane systems, the system is highly scalable and can be efficiently distributed close to coastal populations or inland population centers.

Additionally, pre-treatment is not required with the system. Suspended matter in the source water flows harmlessly through the membranes of the system, due to the membrane spacing, making pre-treatment unnecessary.

Energy and water are intimately connected. Vast amounts of energy are used in pumping water to the point of use. The systems of preferred embodiments are much more energy efficient than either conventional desalination plants, or water import projects such as the Colorado River Aqueduct and the California State Water Project. As such, the increased efficiencies result in lower energy consumption. As most power generation emits greenhouse gases (e.g., coal fired plants), lower unit energy use for water lowers greenhouse gas emissions proportionately.

Reverse Osmosis Membrane Systems and Configurations

As discussed above, any suitable configuration can be employed for the reverse osmosis membranes used in the systems of preferred embodiments. These include loose spiral-wound configurations (thicker feed spacer than traditional), wherein flat sheet membranes are wrapped around a center collection pipe. The density of such systems is typically from about 200 to 1,000 kg/m$^3$. Module diameters typically are up to 40 cm or more. Feed flows axially on a cylindrical module and permeate flows into the central pipe. Spiral wound systems exhibit high pressure durability, are compact, exhibit a low permeate pressure drop and low membrane concentration, and exhibit a minimum concentration polarization.

Another membrane type that can advantageously be employed in systems of preferred embodiments is a hollow fiber membrane. A large number of these hollow fibers, e.g., hundreds or thousands, are bundled together and housed in modules. In operation, pressure at depth is applied to the exterior of the fibers, forcing potable water into the central channel, or lumen, of each of the fibers while dissolved ions remain outside. The potable water collects inside the fibers and is drawn off through the ends.

The fiber module configuration is a highly desirable one as it enables the modules to achieve a very high surface area per unit volume. The density is typically up to about 30,000 m$^2$/m$^3$. The fibers are typically arranged in bundles or loops which are potted on the ends, with the ends of fibers open on one end to withdraw permeate. The packing density of the fiber membranes in a membrane module is defined as the cross-sectional potted area taken up by the fiber. In preferred embodiments, the membranes are in a spaced apart (e.g., at low packing densities), for example, a spacing between fiber walls of from about 1 mm or less to about 10 mm or more is typically employed.

Typically, the fibers within the module have a packing density (as defined above) of from about 5% or less to about 75% or more, preferably from about 10% to about 60%, and more preferably from about 20% to about 50%. Any suitable inner diameter can be employed for the fibers of preferred embodiments. Due to the high pressures that the fibers are exposed to, it is preferred to employ a small inner diameter for greater structural integrity, e.g., from about 0.05 mm or less to about 1 mm or more, preferably from about 0.10, 0.20, 0.30, 0.40, or 0.50 mm to about 0.6, 0.7, 0.8, or 0.9 mm. The fiber's wall thickness can be selected based on balancing materials used and strength required with filtration efficiency. Typically, a wall thickness of from about 0.1 mm or less to about 3 mm or more, preferably from about 1.1, 1.2, 1.3, 1.4, 1.5, 1.6, 1.7, 1.8, or 1.9 mm to about 2.0, 2.1, 2.2, 2.3, 2.4, 2.5, 2.6, 2.7, 2.8, or 2.9 mm can be employed in certain embodiments. It can be desirable to employ a porous support or packing material in the fiber, e.g., when the fibers have a relatively large diameter or a relatively thin wall, to prevent collapse under pressure at depth. A preferred support is cellulose acetate; however, any suitable support can be employed.

In certain embodiments, it can be advantageous to provide a source of aeration and/or liquid flow (e.g., pressurized water, or pressurized water containing entrained air) to the membrane module beneath the fibers, such that bubbles or liquid can pass along the exterior of the fibers to provide a scrubbing action to reduce fouling and increase membrane life, or to reduce concentration polarization at the membrane surface. Similarly, the membranes can be vibrated (e.g., mechanically) to produce a similar effect. It is generally preferred to allow the membranes to function under ambient conditions without introducing mechanically generated currents or flow into the membranes (e.g., fibers or sheets), so as to minimize energy consumption. However, in certain embodiments (e.g., water with a high degree of turbidity or organics content) it can be desirable to provide such currents or flow so as to increase membrane life by reducing fouling.

The fibers are preferably arranged in cylindrical arrays or bundles, however other configurations can also be employed, e.g., square, hexagonal, triangular, irregular, and the like. It is preferred that the membranes are maintained in an open spaced apart configuration so as to facilitate the flow of seawater and concentrate therethrough; however, in certain embodiments it can be desirable to bundle together fibers or groups of fibers, to partition the fibers, or to enclose the fibers within a protective screen, cage or other configuration to protect the membranes from mechanical forces (e.g., during handling) and to maintain their spacing. Preferably, the partitions or spacers are formed by a spacing between respective fiber groups, however porous (e.g., a screen, clip, or ring) or solid partitions or spacers can also be employed. The fiber bundles can be protected by a support screen which has both vertical and horizontal elements appropriately spaced to provide unrestricted seawater flow around the fibers.

The membranes of any particular configuration (sheet, spiral wound, or fiber) are advantageously provided in cartridge form. The cartridge form permits a desired number of cartridges to be joined to a permeate withdrawal system so as to generate the desired volume of permeate. A cartridge system is also advantageous in facilitating removal and replacement of a cartridge with fouled or leaking membranes.

Over time the membrane's efficiency decreases due to adsorption of impurities on the membrane surface. Scaling reduces efficiency of membranes by suspended inorganic particles, such as calcium carbonate, barium sulfate and iron compounds blocking filtration capacity and/or increasing operation pressure. Fouling occurs when organic, colloidal and suspended particles block filtration capacity. Membranes can be cleaned using conventional anti-scalants and anti-foulants to regenerate filtration capacity and increase membrane life. Physical cleaning methods, such as backwashing, can also be effective in regenerating a membrane to increase membrane life. In backwashing, permeate is forced back through the membrane. The membranes employed in the systems of preferred embodiments can be placed on a regular cleaning schedule for preventative maintenance, or a regular membrane replacement schedule. Alternatively, systems can be employed to detect when cleaning or replacement is necessary (e.g., when permeate flow rate decreases by a preselected amount, or when pressure necessary to maintain a permeate flow rate increases to a preselected amount).

Alternative Power Supplies

Because the system has much lower energy requirements than conventional desalination systems, it is particularly suitable for integration with renewable power resources such as wind generators or solar photovoltaic to serve small, remote water loads. Likewise, if the system is situated in an area that experiences very high and very low tides, tidal energy can be advantageously employed to generate power for the system. If local, abundant, and/or low cost fuel sources are available (e.g., biodiesel, methane, natural gas, biogas, ethanol, methanol, diesel, gasoline, bunker fuel, coal, or other hydrocarbonaceous fuels), it can be desirable to select power generators that can take advantage of these fuel sources.

Alternative Embodiments

Although described herein above with particular reference to reverse osmosis membranes and ocean desalination applications, embodiments can be used to advantage with other types of membranes and in numerous other applications, for example as described above.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

All references cited herein are incorporated herein by reference in their entirety. To the extent publications and patents or patent applications incorporated by reference contradict the disclosure contained in the specification, the specification is intended to supersede and/or take precedence over any such contradictory material.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Where a range of values is provided, it is understood that the upper and lower limit, and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

What is claimed is:

1. A water treatment system, comprising:
   a shaft configured to be submerged to a depth extending down into the earth and flooded with water to be treated, the water having a first pressure at the submerged depth;
   an inflow tube disposed within the shaft;
   at least one membrane disposed with the inflow tube, the membrane having a concentrate side and a permeate side;
   a plurality of guides aligned with a vertical length of the shaft;
   a collector in fluid communication with the permeate side of the membrane; and
   a passageway configured to expose an interior of the collector to a second pressure which is lower than the first pressure, wherein exposing the concentrate side of the membrane to the first pressure drives a filtration process in which permeate moves across the membrane from the concentrate side to the permeate side.

2. The water treatment system of claim 1, further comprising a pump oriented between the collector and the passageway, wherein the pump causes permeate to flow in the direction of the surface.

3. The water treatment system of claim 2, further comprising a pump well housing the pump, the pump well further comprising a pipe extending from the pump and connecting with the passageway.

4. The water treatment system of claim 1, wherein the guides are continuous along the length of the shaft.

5. The water treatment system of claim 1, wherein the guides comprise a plurality of segments along the length of the shaft, each segment configured to engage an adjacent segment.

6. The water treatment system of claim 1, wherein the guides are located between the shaft and the inflow tube.

7. The water treatment system of claim 1, wherein the at least one membrane is a spiral wound membrane that is wrapped around the passageway.

* * * * *